(12) United States Patent
Ohashi et al.

(10) Patent No.: US 8,705,225 B2
(45) Date of Patent: Apr. 22, 2014

(54) ELECTRIC DOUBLE LAYER CAPACITOR WITH NON-EQUAL AREAS OF THE ACTIVE MATERIAL LAYERS OF THE POSITIVE ELECTRODE AND THE NEGATIVE ELECTRODE

(75) Inventors: Yoshihiko Ohashi, Tokyo (JP); Keita Kobayashi, Tokyo (JP); Hidetake Itoh, Tokyo (JP); Kazuo Katai, Tokyo (JP)

(73) Assignee: TDK Corporation, Tokyo (JP)

( * ) Notice: Subject to any disclaimer, the term of this patent is extended or adjusted under 35 U.S.C. 154(b) by 347 days.

(21) Appl. No.: 12/748,560

(22) Filed: Mar. 29, 2010

(65) Prior Publication Data

US 2010/0246095 A1 Sep. 30, 2010

(30) Foreign Application Priority Data

Mar. 31, 2009 (JP) ................................. 2009-085653
Mar. 31, 2009 (JP) ................................. 2009-085655

(51) Int. Cl.
*H01G 9/00* (2006.01)

(52) U.S. Cl.
USPC .......................................................... 361/502

(58) Field of Classification Search
USPC .................................. 361/502; 429/162, 163
See application file for complete search history.

(56) References Cited

U.S. PATENT DOCUMENTS

| | | | | |
|---|---|---|---|---|
| 5,369,546 A | * | 11/1994 | Saito et al. | 361/502 |
| 5,742,474 A | * | 4/1998 | Shimizu et al. | 361/502 |
| 5,850,331 A | * | 12/1998 | Matsumoto et al. | 361/502 |
| 5,953,204 A | * | 9/1999 | Suhara et al. | 361/502 |
| 6,072,691 A | * | 6/2000 | Suhara et al. | 361/502 |
| 6,414,837 B1 | | 7/2002 | Sato et al. | |
| 6,650,531 B2 | * | 11/2003 | Ikeda et al. | 361/502 |
| 6,762,926 B1 | * | 7/2004 | Shiue et al. | 361/502 |
| 7,177,139 B2 | * | 2/2007 | Oizumi | 361/502 |
| 7,317,607 B2 | * | 1/2008 | Omura et al. | 361/502 |
| 7,733,630 B2 | | 6/2010 | Maeda et al. | |
| 7,881,043 B2 | * | 2/2011 | Hirose et al. | 361/502 |
| 2006/0279902 A1 | * | 12/2006 | Gallay et al. | 361/301.3 |
| 2008/0199737 A1 | * | 8/2008 | Kazaryan et al. | 429/9 |
| 2009/0029260 A1 | | 1/2009 | Hagiwara et al. | |
| 2009/0147441 A1 | * | 6/2009 | Yoshida et al. | 361/502 |

FOREIGN PATENT DOCUMENTS

| | | |
|---|---|---|
| CN | 101147218 A | 3/2008 |
| JP | 03084915 A * | 4/1991 |
| JP | A-0-270293 | 10/1998 |
| JP | A-2000-208378 | 7/2000 |
| JP | A-2001-185459 | 7/2001 |
| JP | A-2002-142369 | 5/2002 |
| JP | 2007214442 A * | 8/2007 |
| JP | A-2009-32727 | 2/2009 |
| WO | WO 2007/026492 A1 | 3/2007 |

* cited by examiner

*Primary Examiner* — David M Sinclair
(74) *Attorney, Agent, or Firm* — Oliff PLC

(57) ABSTRACT

An electric double layer capacitor comprising a plurality of electrode bodies comprising a positive electrode and a negative electrode laminated via a separator and being impregnated with an electrolyte solution, wherein the plurality of electrode bodies are electrically connected in series, the positive electrode and the negative electrode comprise an active material having pores, the electrolyte solution comprises an electrolyte having a cation and a counteranion of the cation, a ratio of an average pore diameter of the active material of the positive electrode to an ion diameter of the counteranion is in the range of 2.5 to 2.8, and a ratio of an average pore diameter of the active material of the negative electrode to an ion diameter of the cation is in the range of 1.65 to 1.85.

11 Claims, 2 Drawing Sheets ically connected in series, the positive electrode and the negative electrode comprise an active material having pores, the electrolyte solution comprises an electrolyte having a cation and a counteranion of the cation, a ratio of an average pore diameter of the active material of the positive electrode to the ion diameter of the counteranion is in the range of 2.5 to 2.8, and a ratio of an average pore diameter of the active material of the negative electrode to an ion diameter of the cation is in the range of 1.65 to 1.85.
ELECTRIC DOUBLE LAYER CAPACITOR WITH NON-EQUAL AREAS OF THE ACTIVE MATERIAL LAYERS OF THE POSITIVE ELECTRODE AND THE NEGATIVE ELECTRODE

BACKGROUND OF THE INVENTION

1. Field of the Invention

The present invention relates to an electric double layer capacitor.

2. Related Background Art

In recent years, with a higher power of electronic equipment, an improvement in the working voltage of an electric double layer capacitor as a power supply has been attempted. A method for connecting a plurality of cells in series is proposed as one method for improving the working voltage of an electric double layer capacitor (for example, see Japanese Patent Laid-Open No. 2000-208378). Japanese Patent Laid-Open No. 2000-208378 discloses an electric double layer capacitor in which a plurality of capacitor elements are surface-contacted via a conductive rubber sheet, contacted in series, and housed in a metal case.

In an electric double layer capacitor using cells connected in series in this manner, when variations in the holding voltage of individual cells occur, overcharged cells degrade with charge and discharge cycles, thereby, the life of the entire electric double layer capacitor may degrade. Therefore, the suppression of such variations in the holding voltage of cells is studied (for example, see Japanese Patent Laid-Open No. 2002-142369). Japanese Patent Laid-Open No. 2002-142369 discloses an electric double layer capacitor that suppresses variations in holding voltage caused by a difference in leakage current between individual cells.

SUMMARY OF THE INVENTION

However, in the electric double layer capacitors in Japanese Patent Laid-Open Nos. 2000-208378 and 2002-142369, although higher power is achieved by connecting a plurality of cells in series, the life of the electric double layer capacitors is not sufficient. Therefore, an electric double layer capacitor in which both higher power and longer life can be achieved at a high level is required.

The present invention has been made in view of the above problem. It is an object of the present invention to provide an electric double layer capacitor in which both higher power and longer life can be achieved at a high level.

The present invention provides an electric double layer capacitor comprising a plurality of electrode bodies comprising a positive electrode and a negative electrode laminated via a separator and being impregnated with an electrolyte solution, wherein the plurality of the electrode bodies are electrically connected in series, the positive electrode and the negative electrode comprise an active material having pores, the electrolyte solution comprises an electrolyte having a cation and a counteranion of the cation, a ratio of an average pore diameter of the active material of the positive electrode to the ion diameter of the counteranion is in the range of 2.5 to 2.8, and a ratio of an average pore diameter of the active material of the negative electrode to an ion diameter of the cation is in the range of 1.65 to 1.85.

In the present invention, both higher power and longer life can be achieved at a high level. The reason for this is not clear, but the present inventors consider as follows. However, the factors are not limited to these.

When voltage is applied to an electric double layer capacitor, the counteranions in the electrolyte solution move to the positive electrode side, and the cations move to the negative electrode side. The counteranions moving to the positive electrode side enter the pores of the active material of the positive electrode and are adsorbed on the inner walls of the pores. The cations moving to the negative electrode side enter the pores of the active material of the negative electrode and are adsorbed on the inner walls of the pores. The cations and the counteranions (hereinafter labeled as "ions" in some cases) adsorbed on the inner walls of the pores hold kinetic energy for certain time, and most of the ions are deactivated as they are, but part of the ions are desorbed from the inner walls of the pores due to the kinetic energy. When the inner walls of the pores of the active materials of the positive electrode and the negative electrode are so close that the desorbed ions are readsorbed (that is, when the average pore diameter is small to some degree), the ions are adsorbed on the inner walls of the pores again. On the other hand, when the average pore diameter is larger than necessary, the desorbed ions are liberated in the electrolyte solution as they are. Therefore, it is considered that voids where the ions are not adsorbed may be present in the active material surfaces.

Here, the energy held by the adsorbed ions is given by charges charged on the surfaces of the active materials of the positive electrode and the negative electrode during charge. In the above void portions, the electrolyte solution may be decomposed by charges that cannot contribute to ion adsorption. In a case where a plurality of electrode bodies are connected in series, when there are voltage variations for each electrode body, the above phenomenon due to a large average pore diameter of the active material of the positive electrode and the active material of the negative electrode occurs for each electrode body, and the capacity decreases in part of the electrode bodies.

On the other hand, when the average pore diameter of the active material of the positive electrode and the active material of the negative electrode is small, the counteranions and the cations cannot enter the pores, and the capacity decreases in part of the electrode bodies. Even if the ions can enter the pores, the repulsion of the ions for each other acts because the distance between the ions is close. Therefore, the ions are prevented from being adsorbed inside the pores, and the capacity decreases in part of the electrode bodies.

If the capacity of part of the electrode bodies decreases as described above, the load during voltage application is large in the low capacity electrode body, and therefore, the decomposition of the electrolyte solution in the electrode body is more remarkable than in a case where an electrode body is used alone, and the life of the entire electric double layer capacitor degrades.

On the other hand, in the present invention, the ion diameter of the counteranion is a specific size with respect to the average pore diameter of the active material of the positive electrode, and the ion diameter of the cation is a specific size with respect to the average pore diameter of the active material of the negative electrode. Therefore, the counteranions and the cations easily enter the pores of the active material of the positive electrode and the active material of the negative electrode and are adsorbed inside the pores, and when the plurality of electrode bodies are connected in series, the adsorption efficiency of the counteranions and the cations is averaged. Thus, the capacity of the plurality of electrode bodies is made uniform, and degradation accompanying the charge and discharge cycles of the electric double layer capacitor can be suppressed. Therefore, both higher power and longer life can be achieved at a high level.

A material of the active material of the positive electrode is preferably the same as a material of the active material of the negative electrode. In the case of an electric double layer capacitor, a pair of a positive electrode and a negative electrode form polarized electrodes. The electrode active material being the same material in the positive electrode and the negative electrode makes it easy to suitably achieve the required polarized state.

The electrolyte is preferably at least one of tetraethylammonium tetrafluoroborate and triethylmonomethylammonium tetrafluoroborate. In this case, both higher power and longer life can be achieved at a higher level.

Also, the present inventors have studied the factor of the insufficient life of the electric double layer capacitors described above and found that the cause is such that in conventional electric double layer capacitors, the electrode area of the positive electrode and the negative electrode may be made different for an improvement in capacity and a reduction in impedance, thereby, variations in the holding voltage of individual cells may occur. Due to such variations in holding voltage, overcharged cells degrade with charge and discharge cycles, and the life of the entire electric double layer capacitor degrades. But, the present inventors have found that such problems can be solved by the electrode area of the positive electrode and the negative electrode satisfying predetermined conditions.

The present invention provides an electric double layer capacitor comprising a plurality of electrode bodies comprising a positive electrode and a negative electrode laminated via a separator, the positive electrode and the negative electrode having an active material layer formed on a current collector, wherein the plurality of electrode bodies are electrically connected in series, in each of the plurality of electrode bodies, a ratio of an area of the active material layer of the positive electrode to an area of the active material layer of the negative electrode is in the range of 78 to 128%, in the plurality of electrode bodies, a ratio of a maximum value of an area of the active material layers of the positive electrodes to a minimum value of an area of the active material layers of the positive electrodes is 105% or less, and in the plurality of electrode bodies, a ratio of a maximum value of an area of the active material layers of the negative electrodes to a minimum value of an area of the active material layers of the negative electrodes is 105% or less.

In the present invention, the ratio of the area of the active material layer of the positive electrode to the area of the active material layer of the negative electrode is in the range of 78 to 128% in each of the plurality of electrode bodies connected in series, and the ratio of the maximum value of the area of the active material layers of the electrodes having the same polarity in different electrode bodies to the minimum value of the area of the active material layers is 105% or less, thereby, the occurrence of variations in holding voltage due to a difference in area is suppressed. Thus, voltage is equally applied to each of the plurality of electrode bodies, and the degradation accompanying the charge and discharge cycles of the electric double layer capacitor can be suppressed. Therefore, both higher power and longer life can be achieved at a high level.

The present invention provides an electric double layer capacitor in which both higher power and longer life can be achieved at a high level.

DESCRIPTION OF THE PREFERRED EMBODIMENTS

The preferred embodiments of the present invention will be described below in detail with reference to the accompanying drawings. In the description of the drawings, like numerals indicate like or corresponding elements, and redundant description is omitted. Also, the dimensional ratio in each drawing is not necessarily consistent with the actual dimensional ratio.

Figure 1:
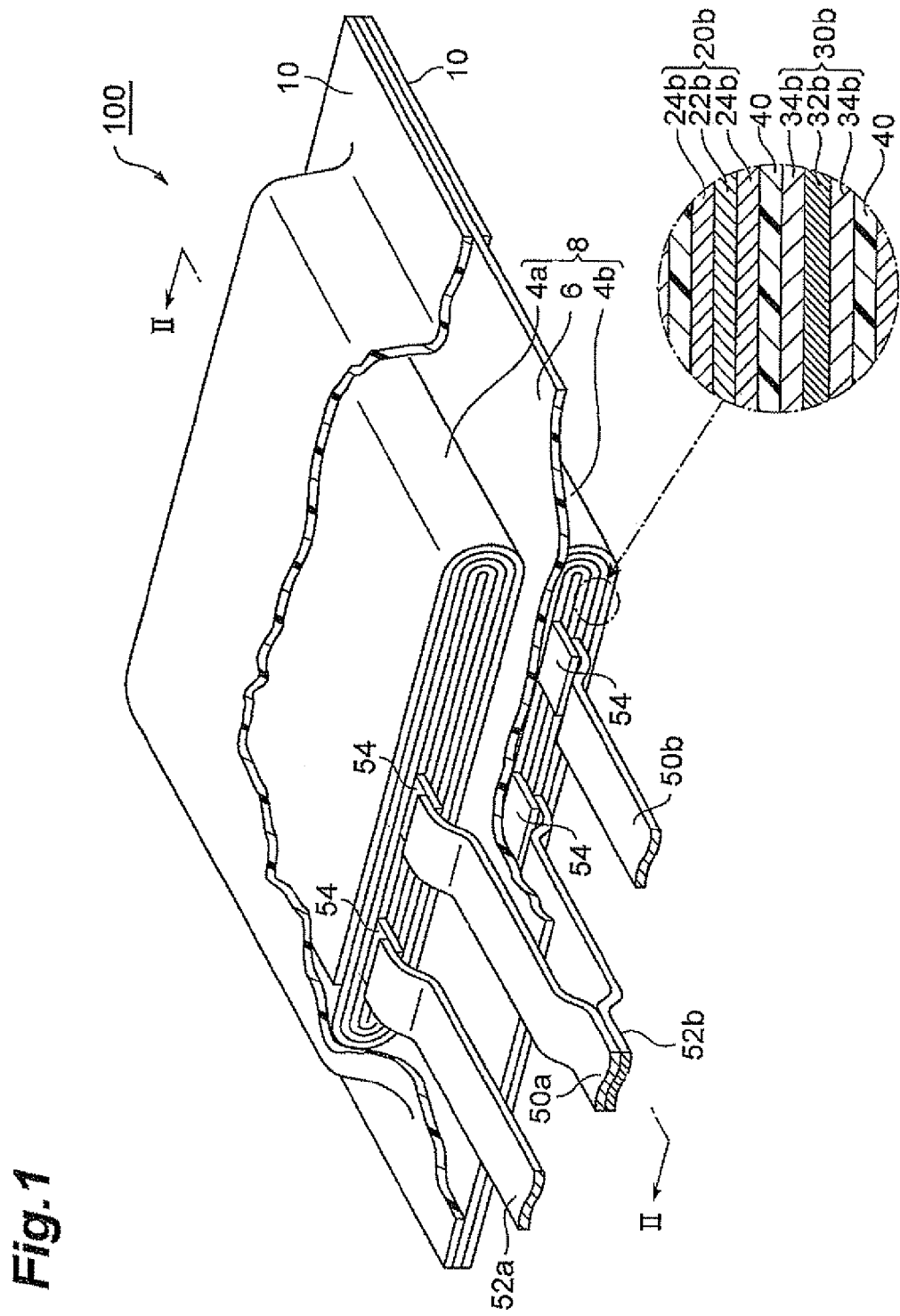
FIG. 1 is a perspective view showing an electric double layer capacitor in one embodiment of the present invention, part of which is cut away.
Figure 2:
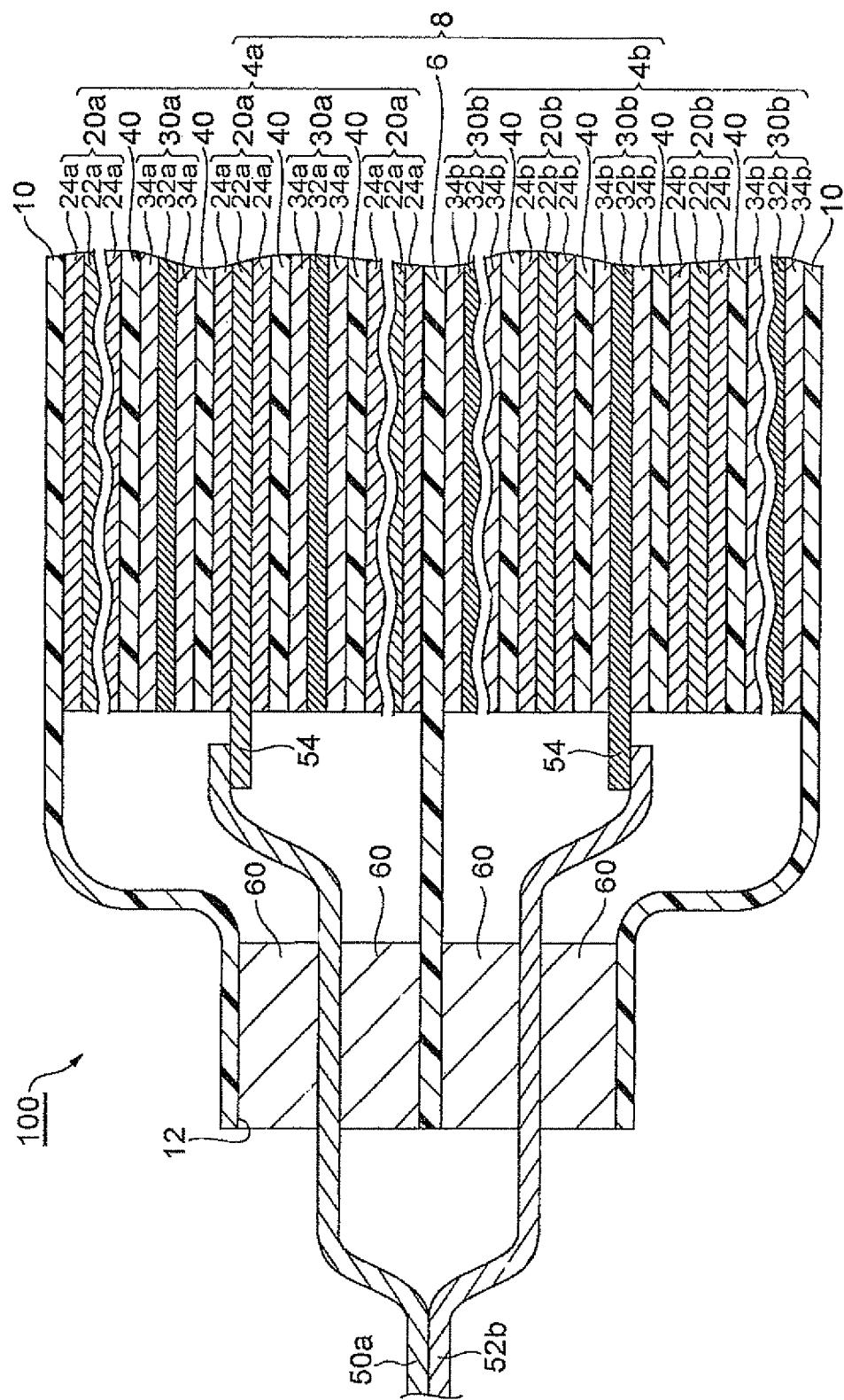
FIG. 2 is a cross-sectional view taken along line II-II in FIG. 1.

First, an electric double layer capacitor 100 will be described with reference to FIGS. 1 and 2. FIG. 1 is a perspective view showing the electric double layer capacitor 100, part of which is cut away. FIG. 2 is a cross-sectional view taken along line II-II in FIG. 1.

The electric double layer capacitor 100 includes a laminate 8 in which two electrode bodies 4a and 4b are laminated via a partition 6, an exterior body 10 housing the laminate 8, and leads 50a, 50b, 52a, and 52b.

The electrode body 4a is a wound body in which a strip-like laminate in which a strip-like positive electrode 20a/a strip-like separator 40/a strip-like negative electrode 30a/a strip-like separator 40 are laminated in this order is wound in the longitudinal direction. The electrode body 4b is a wound body in which a strip-like laminate in which a strip-like positive electrode 20b/a strip-like separator 40/a strip-like negative electrode 30b/a strip-like separator 40 are laminated in this order is wound in the longitudinal direction. Cross sections of the electrode bodies 4a and 4b, perpendicular to the width direction of the strip-like laminates, are substantially elliptical. The electrode bodies 4a and 4b are located so that one ends of the strip-like laminates in the width direction face the opening 12 of the exterior body 10, and one side of each of the electrode bodies 4a and 4b is in contact with the partition 6.

The positive electrode 20a includes a strip-like positive electrode current collector 22a and positive electrode active material layers 24a formed on the front surface and back surface of the positive electrode current collector 22a. The negative electrode 30a includes a strip-like negative electrode current collector 32a and negative electrode active material layers 34a formed on the front surface and back surface of the negative electrode current collector 32a. The positive electrode 20b includes a strip-like positive electrode current collector 22b and positive electrode active material layers 24b formed on the front surface and back surface of the positive electrode current collector 22b. The negative electrode 30b includes a strip-like negative electrode current collector 32b and negative electrode active material layers 34b formed on the front surface and back surface of the negative electrode current collector 32b. The "positive electrode" is an electrode on which the counteranions in the electrolyte solution are adsorbed when voltage is applied to the electric double layer capacitor. The "negative electrode" is an electrode on which the cations in the electrolyte solution are adsorbed when voltage is applied to the electric double layer capacitor. When the electric double layer capacitor is recharged after it is charged once by applying voltage in a specific positive and negative direction, usually the electric double layer capacitor is charged in the same direction as the first time, and it is rare that the electric double layer capacitor is charged by applying voltage in the opposite direction.

The positive electrode current collectors 22a and 22b and the negative electrode current collectors 32a and 32b are not particularly limited as long as they are materials having generally high conductivity. Metal materials having low electrical resistance are preferably used. For example, copper, aluminum, nickel, and the like are used. The thickness of the positive electrode current collectors 22a and 22b and the negative electrode current collectors 32a and 32b is, for example, in the range of about 10 to 50 μm. A lead connection tab 54 is provided on the positive electrode current collectors 22a and 22b and the negative electrode current collectors 32a and 32b. The tabs 54 protrude on the opening 12 side of the exterior body 10 in the electrode bodies 4a and 4b.

The positive electrode active material layers 24a and 24b and the negative electrode active material layers 34a and 34b include an active material and a binder and preferably include a conductive aid.

Examples of the active material include electronically conductive porous bodies having pores, for example, carbon materials, such as natural graphite, artificial graphite, mesocarbon microbeads, mesocarbon fibers (MCF), cokes, glassy carbon, and burned organic compounds. The materials of the positive electrode active material layers 24a and 24b and the negative electrode active material layers 34a and 34b are preferably the same active material.

The binder is not particularly limited as long as it can fix the above active material and preferably the conductive aid to the current collector. Various binders can be used. Examples of the binder include fluororesins, such as polyvinylidene fluoride (PVDF) and polytetrafluoroethylene (PTFE), mixtures of styrene-butadiene rubber (SBR) and water-soluble polymers (carboxymethylcellulose, polyvinyl alcohol, sodium polyacrylate, dextrin, gluten, and the like), and the like.

The conductive aid is a material added to increase the electronic conductivity of the positive electrode active material layers 24a and 24b and the negative electrode active material layers 34a and 34b. Examples of the conductive aid include carbon materials, such as carbon black and acetylene black, fine powders of metals, such as copper, nickel, stainless, and iron, mixtures of carbon materials and metal fine powders, and conductive oxides, such as ITO.

The thickness of the positive electrode active material layers 24a and 24b and the negative electrode active material layers 34a and 34b is, for example, in the range of about 1 to 200 μm. The positive electrode active material layers 24a and 24b and the negative electrode active material layers 34a and 34b are formed on the current collectors so as to avoid the tabs 54 on which the leads are provided. The positive electrode active material layers 24a and 24b and the negative electrode active material layers 34a and 34b can be fabricated by publicly known methods.

The separators 40 provide electrical insulation between the positive electrode 20a and the negative electrode 30a and between the positive electrode 20b and the negative electrode 30b respectively and are electrically insulating porous bodies. The separator 40 is not particularly limited, and various separator materials can be used. Examples of the electrically insulating porous body include a single-layer film or laminate film of polyethylene, polypropylene, or polyolefin, a stretched film of a mixture of the above resins, or a fiber nonwoven fabric of at least one constituent material selected from the group consisting of cellulose, polyester, and polypropylene. The thickness of the separator 40 is, for example, in the range of about 5 to 50 μm.

The partition 6 is made of a material, through which the electrolyte solutions described later included in the two electrode bodies 4a and 4b respectively do not pass, and is formed, for example, with a synthetic resin such as an epoxy resin, or a laminate of a sheet of metal such as aluminum or stainless and a resin film (polypropylene or the like). The thickness of the partition 6 is, for example, in the range of about 10 to 100 μm. By providing the partition 6, the mixing of the electrolyte solutions included in the two electrode bodies 4a and 4b respectively, with each other, is suppressed, and a decrease in the voltage of the electric double layer capacitor 100 can be suppressed.

The leads 50a, 50b, 52a, and 52b are conductive members that serve as current input/output terminals for the positive electrode current collectors 22a and 22b and the negative electrode current collectors 32a and 32b, and have a rectangular plate shape. The thickness of the leads 50a, 50b, 52a, and 52b is, for example, in the range of about 50 to 1000 μm.

One longitudinal end of the lead 50a is electrically connected to the positive electrode current collector 22a of the positive electrode 20a in one electrode body 4a. One longitudinal end of the lead 52a is electrically connected to the negative electrode current collector 32a of the negative electrode 30a in the electrode body 4a. One longitudinal end of the lead 50b is electrically connected to the positive electrode current collector 22b of the positive electrode 20b in the other electrode body 4b. One longitudinal end of the lead 52b is electrically connected to the negative electrode current collector 32b of the negative electrode 30b in the electrode body 4b. The leads 50a, 50b, 52a, and 52b, and the tabs 54 provided on the current collectors are fixed to each other, for example, by a conductive adhesive, solder, welding, or the like. The leads 50a, 50b, 52a, and 52b extend outside the exterior body 10 from the above one ends of the leads through the opening 12.

The lead 50a and the lead 52b protrude respectively from positions spaced and opposed in the lamination direction of the electrode bodies 4a and 4b in the opening 12, and are in contact with and are electrically connected to each other outside the exterior body 10. Thus, the leads 50a and 52b connected to the current collectors having different polarities from each other are electrically connected, thereby, the two electrode bodies 4a and 4b are connected in series, and the voltage of the electric double layer capacitor 100 can be improved.

The exterior body 10 hermetically seals the electrode bodies 4a and 4b and prevents air and moisture from entering inside the case. For example, synthetic resins such as an epoxy resin, and a laminate of a sheet of metal such as aluminum or stainless and a resin film (polypropylene, polyethylene, or the like) can be used as the exterior body 10. The thickness of the wall of the exterior body 10 is, for example, in the range of about 10 to 500 μm.

A sealing member 60 is located around the leads 50a, 50b, 52a, and 52b in the opening 12 of the exterior body 10. This sealing member 60 adheres the inner wall of the exterior body 10 and the leads, thereby, the opening 12 is sealed. Materials having good adhesion to the opening 12 when heat sealed to the opening 12 should be used as the sealing member 60. Specifically, an ethylene-vinyl acetate copolymer, an ethylene-acrylate copolymer, a polypropylene polymer, and the like can be used as the sealing member 60.

The interior space of the exterior body 10 is filled with the electrolyte solution (not shown), and the interiors of the positive electrodes 20a and 20b, the negative electrodes 30a and 30b, and the separator 40 are impregnated with part of the electrolyte solution.

As the electrolyte solution, one in which an electrolyte is dissolved in an organic solvent is used. The electrolyte has a cation and the counteranion of the cation. As the electrolyte, for example, quaternary ammonium salts, such as tetraethylammonium tetrafluoroborate (TEA$^+$BF$_4^-$) and triethylmonomethylammonium tetrafluoroborate (TEMA$^+$BF$_4^-$), are preferably used.

One of these electrolytes may be used alone, or two or more of these electrolytes may be used in combination.

Publicly known solvents can be used as the organic solvent. Examples of the organic solvent preferably include propylene carbonate, ethylene carbonate, diethyl carbonate, and the like. These may be used alone, or two or more of these may be mixed in any proportion and used.

(Embodiment A)

The correlation between the average pore diameter of a positive electrode active material and the ion diameter of a counteranion, and the correlation between the average pore diameter of a negative electrode active material and the ion diameter of a cation in Embodiment A will be described. In Embodiment A, the above correlations between the average pore diameter and the ion diameter are satisfied in either of the electrode bodies 4a and 4b. The average pore diameter of the active materials can be measured by a mercury porosimeter.

The ratio of the average pore diameter of the positive electrode active material to the ion diameter of the counteranion (the average pore diameter of the positive electrode active material/the ion diameter of the counteranion) is in the range of 2.5 to 2.8, and is particularly preferably in the range of 2.6 to 2.7 from the viewpoint of increasing the entry efficiency of the counteranions into the pores of the positive electrode active material, and the adsorption efficiency of the counteranions on the inner walls of the pores. The ratio of the average pore diameter of the negative electrode active material to the ion diameter of the cation (the average pore diameter of the negative electrode active material/the ion diameter of the cation) is in the range of 1.65 to 1.85, and is particularly preferably in the range of 1.7 to 1.8 from the viewpoint of increasing the entry efficiency of the cations into the pores of the negative electrode active material, and the adsorption efficiency of the cations on the inner walls of the pores.

The average pore diameter of the positive electrode active material is appropriately selected depending on the counteranion used, from the viewpoint of increasing the entry efficiency of the counteranions into the pores of the positive electrode active material and simultaneously increasing the adsorption efficiency of the counteranions. For example, in the case of a tetrafluoroborate anion (ion diameter: 4.9 Å), the average pore diameter of the positive electrode active material is preferably in the range of 12.7 to 13.7 Å, more preferably 12.8 to 13.4 Å. The average pore diameter of the negative electrode active material is appropriately selected depending on the cation used, from the viewpoint of increasing the entry efficiency of the cations into the pores of the negative electrode active material and simultaneously increasing the adsorption efficiency of the cations. For example, in the case of a triethylmonomethylammonium cation (ion diameter: 7.4 Å), the average pore diameter of the negative electrode active material is preferably in the range of 11.9 to 13.4 Å, more preferably 12.5 to 13.2 Å. In the case of a tetraethylammonium cation (ion diameter: 8.1 Å), the average pore diameter of the negative electrode active material is preferably in the range of 13.2 to 15.0 Å, more preferably 14.0 to 14.6 Å. The average pore diameter of the positive electrode active material and the negative electrode active material can be made the desired size by changing the treatment time and treatment temperature for activation treatment using an alkali reagent, such as potassium hydroxide, and a water vapor. The average pore diameter of the active materials can be measured with a mercury porosimeter using mercury intrusion.

The ion diameter of the cation is preferably in the range of 5 to 10 Å, more preferably 7.0 to 8.5 Å, and further preferably 7.2 to 8.3 Å, from two viewpoints of ensuring such mobility that the cations can be attracted by charges on the negative electrode surface, migrate in the electrolyte solution, and enter the pores of the negative electrode active material, and ensuring such a size that the cations can be adsorbed on the inner walls of the pores. The ion diameter of a tetraethylammonium cation is 8.1 Å, and the ion diameter of a triethylmonomethylammonium cation is 7.4 Å.

The ion diameter of the counteranion is preferably in the range of 4 to 5.5 Å, more preferably 4.2 to 5.3 Å, and further preferably 4.5 to 5.2 Å, from two viewpoints of ensuring such mobility that the counteranions can be attracted by charges on the positive electrode surface, migrate in the electrolyte solution, and enter the pores of the positive electrode active material, and ensuring such a size that the counteranions can be adsorbed on the inner walls of the pores. The ion diameter of a tetrafluoroborate anion is 49 Å.

In Embodiment A, the correlation of the area of the active material layers described below is preferably satisfied. The area of the active material layers is the area of the active material layers wound to function as the electric double layer capacitor. Usually, this area is equal to the area of the active material layers of the strip-like electrode before being wound. In Embodiment A, the area of the active material layers of either the positive electrode or the negative electrode is defined as the total area of all active material layers of either the positive electrode or the negative electrode of one electrode body. The area of the active material layers can be easily adjusted by changing the length and width of the current collector, the length and width of the active material layers formed on the current collector, and the like.

In Embodiment A, the ratio of the area of the positive electrode active material layers to the area of the negative electrode active material layers is preferably in the range of 78 to 128% in each of the plurality of electrode bodies. In other words, the ratio of the area of the positive electrode active material layers 24a of the positive electrode 20a to the area of the negative electrode active material layers 34a of the negative electrode 30a in one electrode body 4a, and the ratio of the area of the positive electrode active material layers 24b of the positive electrode 20b to the area of the negative electrode active material layers 34b of the negative electrode 30b in the other electrode body 4b are preferably in the range of 78 to 128%, more preferably 80 to 125%, and further preferably 81 to 123%, from the viewpoint that both higher power and longer life can be achieved at a higher level.

Also, in the two electrode bodies 4a and 4b, the ratio of the maximum value to the minimum value of the area of the positive electrode active material layers 24a of the positive electrode 20a and the area of the positive electrode active material layers 24b of the positive electrode 20b is preferably 105% or less, more preferably in the range of 100 to 105%, and further preferably in the range of 100 to 103%, from the viewpoint that both higher power and longer life can be achieved at a higher level. For example, when the area of the positive electrode active material layers 24a of the positive electrode 20a is larger than the area of the positive electrode active material layers 24b of the positive electrode 20b, the ratio of the area of the positive electrode active material layer 24a to the area of the positive electrode active material layers 24b is preferably 105% or less.

Further, in the two electrode bodies 4a and 4b, the ratio of the maximum value to the minimum value of the area of the negative electrode active material layers 34a of the negative electrode 30a and the area of the negative electrode active material layers 34b of the negative electrode 30b is preferably 105% or less, more preferably in the range of 100 to 105%, and further preferably in the range of 100 to 103%, from the viewpoint that both higher power and longer life can be achieved at a higher level. For example, when the area of the negative electrode active material layers 34a of the negative electrode 30a is larger than the area of the negative electrode active material layers 34b of the negative electrode 30b, the ratio of the area of the negative electrode active material layers 34a to the area of the negative electrode active material layers 34b is preferably 105% or less.

As long as these relationships are satisfied, the shape of the positive electrode active material layers 24a and 24b and the negative electrode active material layers 34a and 34b, and the distribution ratio of the area of these layers on the front surface and back surface of each current collector are not particularly limited. The positive electrode active material layers 24a and 24b and the negative electrode active material layers 34a and 34b preferably have the same area on the front surfaces and back surfaces of the current collectors respectively.

In Embodiment A, the ion diameter of the counteranion is a specific size with respect to the average pore diameter of the positive electrode active material, and the ion diameter of the cation is a specific size with respect to the average pore diameter of the negative electrode active material. Therefore, the counteranions and the cations easily enter the pores of the positive electrode active material and the negative electrode active material and are adsorbed inside the pores, and when the electrode bodies 4a and 4b are connected in series, the adsorption efficiency of the counteranions and the cations is averaged. Thus, the capacity of the electrode bodies 4a and 4b is made uniform, and degradation accompanying the charge and discharge cycles of the electric double layer capacitor 100 can be suppressed. Therefore, both higher power and longer life can be achieved at a high level.

Also, in Embodiment A, when in the electrode bodies 4a and 4b connected in series, the ratio of the area of the positive electrode active material layers 24a of the positive electrode 20a to the area of the negative electrode active material layers 34a of the negative electrode 30a, and the ratio of the area of the positive electrode active material layers 24b of the positive electrode 20b to the area of the negative electrode active material layers 34b of the negative electrode 30b are each in the range of 78 to 128%, the ratio of the maximum value to the minimum value of the area of the positive electrode active material layers 24a of the positive electrode 20a in the electrode body 4a and the area of the positive electrode active material layers 24b of the positive electrode 20b in the electrode body 4b is 105% or less, and further, the ratio of the maximum value to the minimum value of the area of the negative electrode active material layers 34a of the negative electrode 30a in the electrode body 4a and the area of the negative electrode active material layers 34b of the negative electrode 30b in the electrode body 4b is 105% or less, the occurrence of variations in the holding voltage of the electrode bodies 4a and 4b due to a difference in area is suppressed. Therefore, voltage is equally applied to each of the electrode bodies 4a and 4b, and the degradation accompanying the charge and discharge cycles of the electric double layer capacitor 100 can be suppressed. Therefore, both higher power and longer life can be achieved at a higher level by a synergistic effect with the above correlation between the average pore diameter and the ion diameter.

The present invention is not limited to the above embodiment, and various modifications can be made. For example, in the above embodiment A, two electrode bodies 4a and 4b are connected in series, but three or more electrode bodies may be connected in series. When three or more electrode bodies are connected in series, the above correlation between the average pore diameter and the ion diameter is satisfied in any of the electrode bodies, and both higher power and longer life can be achieved at a high level. Also, the correlation of the area of the active material layers is preferably satisfied in any of the electrode bodies.

Also, each active material layer may be formed only on one surface of each current collector. Further, in the above embodiment A, the electrode bodies 4a and 4b are wound bodies, but the electrode bodies 4a and 4b are not limited to these and may be laminates, zigzag structures, and the like.

The electric double layer capacitor of the present invention can also be used in applications for power supplies for self-propelled micromachines, IC cards, and the like, and distributed power supplies located on or in a printed board.

(Embodiment B)

The correlation of the area of the active material layers in the positive electrode 20a and the negative electrode 30a of the electrode body 4a and the positive electrode 20b and the negative electrode 30b of the electrode body 4b in Embodiment B will be described. The area of the active material layers is the area of the active material layers wound to function as the electric double layer capacitor. Usually, this area is equal to the area of the active material layers of the strip-like electrode before being wound. In Embodiment B, the area of the active material layers of either the positive electrode or the negative electrode is defined as the total area of all active material layers of either the positive electrode or the negative electrode of one electrode body. The area of the active material layers can be easily adjusted by changing the length and width of the current collector, the length and width of the active material layers formed on the current collector, and the like.

The ratio of the area of the positive electrode active material layers 24a of the positive electrode 20a to the area of the negative electrode active material layers 34a of the negative electrode 30a (the area of the positive electrode active material layers 24a of the positive electrode 20a/the area of the negative electrode active material layers 34a of the negative electrode 30a) in one electrode body 4a, and the ratio of the area of the positive electrode active material layers 24b of the positive electrode 20b to the area of the negative electrode active material layers 34b of the negative electrode 30b (the area of the positive electrode active material layers 24b of the positive electrode 20b/the area of the negative electrode active material layers 34b of the negative electrode 30b) in the other electrode body 4b are in the range of 78 to 128%, and are preferably in the range of 80 to 125%, more preferably 81 to 123%, from the viewpoint of optimizing the voltage balance between the electrode bodies 4a and 4b.

Also, in the two electrode bodies 4a and 4b, the ratio of the maximum value to the minimum value (the maximum value/the minimum value) of the area of the positive electrode active material layers 24a of the positive electrode 20a and the area of the positive electrode active material layers 24b of the positive electrode 20b is 105% or less, and is preferably in the range of 100 to 105%, more preferably 100 to 103%, from the viewpoint of matching the capacity ratio of the electrode bodies 4a and 4b connected in series and reducing degradation. For example, when the area of the positive electrode active material layers 24a of the positive electrode 20a is larger than the area of the positive electrode active material layers 24b of the positive electrode 20b, the ratio of the area of the positive electrode active material layer 24a to the area of the positive electrode active material layers 24b is 105% or less.

Further, in the two electrode bodies 4a and 4b, the ratio of the maximum value to the minimum value (the maximum value/the minimum value) of the area of the negative electrode active material layers 34a of the negative electrode 30a and the area of the negative electrode active material layers 34b of the negative electrode 30b is 105% or less, and is preferably in the range of 100 to 105%, more preferably 100 to 103%, from the viewpoint of matching the capacity ratio of the electrode bodies 4a and 4b connected in series and reducing degradation. For example, when the area of the negative electrode active material layers 34a of the negative electrode 30a is larger than the area of the negative electrode active material layers 34b of the negative electrode 30b, the ratio of the area of the negative electrode active material layer 34a to the area of the negative electrode active material layers 34b is 105% or less.

As long as these relationships are satisfied, the shape of the positive electrode active material layers 24a and 24b and the negative electrode active material layers 34a and 34b, and the distribution ratio of the area of these layers on the front surface and back surface of each current collector are not particularly limited. The positive electrode active material layers 24a and 24b and the negative electrode active material layers 34a and 34b preferably have the same area on the front surfaces and back surfaces of the current collectors respectively.

In Embodiment B, in the electrode bodies 4a and 4b connected in series, the ratio of the area of the positive electrode active material layers 24a of the positive electrode 20a to the area of the negative electrode active material layers 34a of the negative electrode 30a, and the ratio of the area of the positive electrode active material layers 24b of the positive electrode 20b to the area of the negative electrode active material layers 34b of the negative electrode 30b are each in the range of 78 to 128%, the ratio of the maximum value to the minimum value of the area of the positive electrode active material layers 24a of the positive electrode 20a in the electrode body 4a and the area of the positive electrode active material layers 24b of the positive electrode 20b in the electrode body 4b is 105% or less, and further, the ratio of the maximum value to the minimum value of the area of the negative electrode active material layers 34a of the negative electrode 30a in the electrode body 4a and the area of the negative electrode active material layers 34b of the negative electrode 30b in the electrode body 4b is 105% or less. Thus, the occurrence of variations in the holding voltage of the electrode bodies 4a and 4b due to a difference in area is suppressed. Therefore, voltage is equally applied to each of the electrode bodies 4a and 4b, and the degradation accompanying the charge and discharge cycles of the electric double layer capacitor 100 can be suppressed. Therefore, both higher power and longer life can be achieved at a high level.

The present invention is not limited to the above embodiment, and various modifications can be made. For example, in the above embodiment B, two electrode bodies 4a and 4b are connected in series, but three or more electrode bodies may be connected in series. Even if three or more electrode bodies are connected in series, it is only needed that the ratio of the area of the positive electrode active material layers to the area of the negative electrode active material layers is in the range of 78 to 128% in any of the electrode bodies, that the ratio of the value of the area of the positive electrode active material layers to the minimum value of the area of the positive electrode active material layers in all electrode bodies is 105% or less, and that the ratio of the maximum value of the area of the negative electrode active material layers to the minimum value of the area of the negative electrode active material layers in all electrode bodies is 105% or less.

Also, each active material layer may be formed only on one surface of each current collector. Further, in the above embodiment B, the electrode bodies 4a and 4b are wound bodies, but the electrode bodies 4a and 4b are not limited to these and may be laminates, zigzag bodies, and the like.

The electric double layer capacitor of the present invention can also be used in applications for power supplies for self-propelled micromachines, IC cards, and the like, and distributed power supplies located on or in a printed board.

EXAMPLES

The present invention will be described below in more detail by
Examples and Comparative Examples, but the present invention is not limited to these Examples in any way.

Example A1

First, activated carbon particles (manufactured by Kuraray Chemical Co., LTD., trade name: RP-20) as active materials were subjected to activation treatment with potassium hydroxide. Regarding the activation treatment conditions, the temperature was 850° C., and the treatment time was 100 minutes for the positive electrode active material. The temperature was 850° C., and the treatment time was 100 minutes for the negative electrode active material. The average pore diameter of the activated active materials was measured using a mercury porosimeter (manufactured by SHIMADZU CORPORATION, apparatus name: PORE SIZER 9320). The average pore diameter of the positive electrode active material was 13.2 Å, and the average pore diameter of the negative electrode active material was 12.9 Å.

Next, the above activated active material and PVDF as a binder were mixed in a mass ratio of active material:binder=70:30. N-methylpyrrolidone was added to the obtained mixture, and the mixture was kneaded to prepare each of application liquids for the positive electrode and the negative electrode. Then, each application liquid was applied on both surfaces of aluminum foil (thickness: 20 μm) by a doctor blade method and dried to obtain a sheet having positive electrode active material layers with each thickness of 20 μm laminated on both surfaces thereof, and a sheet having negative electrode active material layers with each thickness of 20 μm laminated on both surfaces thereof. Then, two strip-like electrodes on which a lead connection tab was provided were punched out of each of the above sheets so that the length and width of the active material layers were values in Table 1, and a lead of aluminum foil (thickness: 100 μm) was connected to the tab of each electrode by ultrasonic welding.

Next, both surfaces of the positive electrode were covered with a regenerated cellulose nonwoven fabric (thickness: 30 μm, size: 14 mm×195 mm) as a separator. Then, the positive electrode was opposed to the negative electrode, and they were heated and pressurized at 100° C. at 1 kg/cm² for 10 seconds to obtain a strip-like laminate. This laminate was cylindrically wound from its end, and the winding end portion was fastened by a winding fastening tape to obtain a winding type electrode body. Another winding type electrode body was similarly fabricated using the remaining two electrodes.

Next, an exterior body made of an aluminum laminate film having an opening on one side and having its interior divided into two spaces by a partition was prepared. Then, the above electrode bodies were housed one by one in the two spaces, and then, an electrolyte solution was injected into the interior of the exterior body from the opening. The electrolyte solution was one in which triethylmonomethylammonium tetrafluoroborate as an electrolyte was dissolved in propylene carbonate (PC) as an organic solvent, and the electrolyte concentration in the electrolyte solution was 1.0 mol/L.

Next, the leads connected to the electrode bodies were taken out from the opening of the exterior body, and the opening of the laminate film was heat sealed, with the leads sandwiched, using polypropylene as a sealing member to hermetically seal the exterior body. Then, a pair of the leads connected to the electrodes having different polarities in the two electrode bodies were electrically connected outside the exterior body to connect the two electrode bodies in series. In this manner, an electric double layer capacitor having a size of 20 mm×20 mm×27 mm and having the active material layers with the length and width in Table 1 on both surfaces of the current collectors was obtained.

Examples A2 to A54 and Comparative Examples A1 to A16

Electric double layer capacitors in Examples A2 to A54 and Comparative Examples A1 to A16 were obtained as in Example A1, except that the average pore diameter of the active materials, the electrolyte, and the length and width of the active material layers were changed to values in the Examples and the Comparative Examples in Tables 1 to 6. The average pore diameter of the active materials was adjusted by changing the treatment time for the activation treatment.

For Examples A1 to A54 and Comparative Examples A1 to A16, the ratio of the average pore diameter of the positive electrode active material to the ion diameter of the counter-anion (labeled as "Coefficient A" in Tables 4 to 6), and the ratio of the average pore diameter of the active material of the negative electrode to the ion diameter of the cation (labeled as "Coefficient B" in Tables 4 to 6) were calculated. The results are shown in Tables 4 to 6.

<Calculation of Area Ratio>

For Examples A1 to A54 and Comparative Examples A1 to A16, each of the area of one surfaces of the active material layers of the positive electrodes and the negative electrodes was calculated using the values of the length and width of the active material layers in the two electrode bodies (labeled as "+ series" and "− series" in Tables 1 to 3). It was assumed that the negative electrode of the "+ series" electrode body and the positive electrode of the "− series" electrode body were electrically connected. Then, the ratio of the area of the active material layers of the positive electrode to the area of the active material layers of the negative electrode in each of the "+ series" and "− series" electrode bodies, the ratio of the maximum value to the minimum value of the area of the active material layers of the positive electrodes in the "+ series" and "− series" electrode bodies, and the ratio of the maximum value to the minimum value of the area of the active material layers of the negative electrodes in the "+ series" and "− series" electrode bodies were calculated. The results are shown in Tables 1 to 3.

In all the above Examples and Comparative Examples, each electrode has the active material layers on both surfaces of the current collector respectively, and therefore, the area of the active material layers of each electrode used for the calculation of the area ratio is the total value of the area of both surfaces of the active material layers. But, since the area of both surfaces of the active material layers of each electrode is equal to each other in all Examples and Comparative Examples, the result is the same whether the total value of both surfaces is used or the value of one surface is used for the area of the active material layers of each electrode used for the calculation of the area ratio.

<Capacity Retention Measurement>

For the electric double layer capacitors in Examples A1 to A54 and Comparative Examples A1 to A16, the step of performing constant current constant voltage charge (CC-CV charge) at 1 A up to 53 V for 5 seconds and perforating CC-CV discharge at 3 A up to 0 V for 5 seconds, as 1 cycle, was performed for 5000 cycles. In the CC-CV discharge in the first cycle, the time required for the voltage to reach 3 V from 5 V was measured, and the initial capacity value ($C_0$) was calculated using the current value and the required time.

After the above 5000 cycles of charge and discharge, constant current (CC) charge was performed at 50 mA up to 5.7 V, and further, constant voltage (CV) charge was performed at 5.7 V for 10 seconds. Next, CC discharge was performed at 50 mA up to 0 V. The time required for the voltage to reach 3 V from 5 V was measured, and the capacity value ($C_1$) was calculated using the current value and the required time. Then, the ratio of the capacity value ($C_1$) to the initial capacity value ($C_0$) ($=C_1/C_0 \times 100$) was calculated as capacity retention (%). The results are shown in Tables 4 to 6. A case where the capacity retention is 80% or more was determined as good.

TABLE 1

| | Length (mm) | | | | Width (mm) | | | |
| | +series | | −series | | +series | | −series | |
| | Positive electrode | Negative electrode | Positive electrode | Negative electrode | Positive electrode | Negative electrode | Positive electrode | Negative electrode |
|---|---|---|---|---|---|---|---|---|
| Example A1 | 117 | 95 | 117 | 95 | 12 | 12 | 12 | 12 |
| Example A2 | 121 | 95 | 121 | 95 | 12 | 12 | 12 | 12 |
| Example A3 | 113 | 95 | 133 | 95 | 12 | 12 | 12 | 12 |
| Example A4 | 117 | 98 | 117 | 98 | 12 | 12 | 12 | 12 |
| Example A5 | 117 | 92 | 117 | 92 | 12 | 12 | 12 | 12 |
| Example A6 | 95 | 95 | 95 | 95 | 15 | 12 | 15 | 12 |

TABLE 1-continued

| | | | | | | | | |
|---|---|---|---|---|---|---|---|---|
| Example A7 | 95 | 95 | 95 | 95 | 12 | 12 | 12 | 12 |
| Example A8 | 95 | 95 | 95 | 95 | 13 | 13 | 13 | 13 |
| Example A9 | 95 | 95 | 95 | 95 | 13 | 11 | 13 | 11 |
| Example A10 | 117 | 95 | 117 | 95 | 12 | 12 | 12 | 12 |
| Example A11 | 121 | 95 | 121 | 95 | 12 | 12 | 12 | 12 |
| Example A12 | 113 | 95 | 113 | 95 | 12 | 12 | 12 | 12 |
| Example A13 | 117 | 98 | 117 | 98 | 12 | 12 | 12 | 12 |
| Example A14 | 117 | 92 | 117 | 92 | 12 | 12 | 12 | 12 |
| Example A15 | 95 | 95 | 95 | 95 | 15 | 12 | 15 | 12 |
| Example A16 | 95 | 95 | 95 | 95 | 12 | 12 | 12 | 12 |
| Example A17 | 95 | 95 | 95 | 95 | 13 | 13 | 13 | 13 |
| Example A18 | 95 | 95 | 95 | 95 | 13 | 11 | 13 | 11 |

| | Area (mm$^2$) | | | | Area ratio (%) | | | |
|---|---|---|---|---|---|---|---|---|
| | +series | | −series | | +series | −series | — | — |
| | Positive electrode | Negative electrode | Positive electrode | Negative electrode | Positive/ negative | Positive/ negative | Positive/ positive | Negative/ negative |
| Example A1 | 1404 | 1140 | 1404 | 1140 | 123 | 123 | 100 | 100 |
| Example A2 | 1452 | 1140 | 1452 | 1140 | 127 | 127 | 100 | 100 |
| Example A3 | 1356 | 1140 | 1356 | 1140 | 119 | 119 | 100 | 100 |
| Example A4 | 1404 | 1176 | 1404 | 1176 | 119 | 119 | 100 | 100 |
| Example A5 | 1404 | 1104 | 1404 | 1140 | 127 | 127 | 100 | 100 |
| Example A6 | 1425 | 1140 | 1425 | 1140 | 125 | 125 | 100 | 100 |
| Example A7 | 1140 | 1140 | 1140 | 1140 | 100 | 100 | 100 | 100 |
| Example A8 | 1235 | 1235 | 1235 | 1235 | 100 | 100 | 100 | 100 |
| Example A9 | 1235 | 1045 | 1235 | 1045 | 118 | 118 | 100 | 100 |
| Example A10 | 1404 | 1140 | 1404 | 1140 | 123 | 123 | 100 | 100 |
| Example A11 | 1452 | 1140 | 1452 | 1140 | 127 | 127 | 100 | 100 |
| Example A12 | 1356 | 1140 | 1356 | 1140 | 119 | 119 | 100 | 100 |
| Example A13 | 1404 | 1176 | 1404 | 1176 | 119 | 119 | 100 | 100 |
| Example A14 | 1404 | 1104 | 1404 | 1104 | 127 | 127 | 100 | 100 |
| Example A15 | 1425 | 1140 | 1425 | 1140 | 125 | 125 | 100 | 100 |
| Example A16 | 1140 | 1140 | 1140 | 1140 | 100 | 100 | 100 | 100 |
| Example A17 | 1235 | 1235 | 1235 | 1235 | 100 | 100 | 100 | 100 |
| Example A18 | 1235 | 1045 | 1235 | 1045 | 118 | 118 | 100 | 100 |

TABLE 2

| | Length (mm) | | | | Width (mm) | | | |
| | +series | | −series | | +series | | −series | |
| | Positive electrode | Negative electrode | Positive electrode | Negative electrode | Positive electrode | Negative electrode | Positive electrode | Negative electrode |
|---|---|---|---|---|---|---|---|---|
| Example A19 | 117 | 117 | 117 | 117 | 12 | 12 | 12 | 12 |
| Example A20 | 117 | 112 | 117 | 112 | 12 | 12 | 12 | 12 |
| Example A21 | 117 | 123 | 117 | 123 | 12 | 12 | 12 | 12 |
| Example A22 | 117 | 156 | 117 | 156 | 12 | 12 | 12 | 12 |
| Example A23 | 117 | 150 | 117 | 150 | 12 | 12 | 12 | 12 |
| Example A24 | 117 | 92 | 117 | 92 | 12 | 12 | 12 | 12 |
| Example A25 | 117 | 89 | 117 | 89 | 12 | 12 | 12 | 12 |
| Example A26 | 117 | 113 | 113 | 113 | 12 | 12 | 12 | 12 |
| Example A27 | 117 | 118 | 118 | 118 | 12 | 12 | 12 | 12 |
| Example A28 | 117 | 121 | 121 | 121 | 12 | 12 | 12 | 12 |
| Example A29 | 117 | 127 | 127 | 127 | 12 | 12 | 12 | 12 |
| Example A30 | 117 | 110 | 110 | 117 | 12 | 12 | 12 | 12 |
| Example A31 | 117 | 115 | 115 | 117 | 12 | 12 | 12 | 12 |
| Example A32 | 117 | 120 | 120 | 117 | 12 | 12 | 12 | 12 |
| Example A33 | 117 | 123 | 123 | 117 | 12 | 12 | 12 | 12 |
| Example A34 | 117 | 129 | 129 | 117 | 12 | 12 | 12 | 12 |
| Example A35 | 117 | 109 | 117 | 117 | 12 | 12 | 12 | 12 |
| Example A36 | 117 | 112 | 117 | 117 | 12 | 12 | 12 | 12 |
| Example A37 | 117 | 115 | 117 | 117 | 12 | 12 | 12 | 12 |
| Example A38 | 117 | 122 | 117 | 117 | 12 | 12 | 12 | 12 |
| Example A39 | 117 | 127 | 117 | 117 | 12 | 12 | 12 | 12 |
| Example A40 | 117 | 117 | 117 | 108 | 12 | 12 | 12 | 12 |
| Example A41 | 117 | 117 | 117 | 111 | 12 | 12 | 12 | 12 |
| Example A42 | 117 | 117 | 117 | 119 | 12 | 12 | 12 | 12 |
| Example A43 | 117 | 117 | 117 | 123 | 12 | 12 | 12 | 12 |
| Example A44 | 117 | 117 | 117 | 126 | 12 | 12 | 12 | 12 |
| Example A45 | 109 | 117 | 117 | 109 | 12 | 12 | 12 | 12 |
| Example A46 | 112 | 117 | 117 | 112 | 12 | 12 | 12 | 12 |
| Example A47 | 118 | 117 | 117 | 118 | 12 | 12 | 12 | 12 |
| Example A48 | 121 | 117 | 117 | 121 | 12 | 12 | 12 | 12 |
| Example A49 | 125 | 117 | 117 | 125 | 12 | 12 | 12 | 12 |
| Example A50 | 107 | 107 | 117 | 107 | 12 | 12 | 12 | 12 |
| Example A51 | 111 | 111 | 117 | 111 | 12 | 12 | 12 | 12 |
| Example A52 | 118 | 118 | 117 | 118 | 12 | 12 | 12 | 12 |
| Example A53 | 121 | 121 | 117 | 121 | 12 | 12 | 12 | 12 |
| Example A54 | 126 | 126 | 117 | 126 | 12 | 12 | 12 | 12 |

| | Area (mm$^2$) | | | | Area ratio (%) | | | |
| | +series | | −series | | +series | −series | — | — |
| | Positive electrode | Negative electrode | Positive electrode | Negative electrode | Positive/ negative | Positive/ negative | Positive/ positive | Negative/ negative |
|---|---|---|---|---|---|---|---|---|
| Example A19 | 1404 | 1404 | 1404 | 1404 | 100 | 100 | 100 | 100 |
| Example A20 | 1404 | 1344 | 1404 | 1344 | 104 | 104 | 100 | 100 |
| Example A21 | 1404 | 1476 | 1404 | 1476 | 95 | 95 | 100 | 100 |
| Example A22 | 1404 | 1872 | 1404 | 1872 | 75 | 75 | 100 | 100 |
| Example A23 | 1404 | 1800 | 1404 | 1800 | 78 | 78 | 100 | 100 |
| Example A24 | 1404 | 1104 | 1404 | 1104 | 127 | 127 | 100 | 100 |
| Example A25 | 1404 | 1068 | 1404 | 1068 | 131 | 131 | 100 | 100 |
| Example A26 | 1404 | 1356 | 1356 | 1356 | 104 | 100 | 104 | 100 |
| Example A27 | 1404 | 1416 | 1416 | 1416 | 99 | 100 | 101 | 100 |
| Example A28 | 1404 | 1452 | 1452 | 1452 | 97 | 100 | 103 | 100 |
| Example A29 | 1404 | 1524 | 1524 | 1524 | 92 | 100 | 109 | 100 |
| Example A30 | 1404 | 1320 | 1320 | 1404 | 106 | 94 | 106 | 106 |
| Example A31 | 1404 | 1380 | 1380 | 1404 | 102 | 98 | 102 | 102 |
| Example A32 | 1404 | 1440 | 1440 | 1404 | 98 | 103 | 103 | 103 |
| Example A33 | 1404 | 1476 | 1476 | 1404 | 95 | 105 | 105 | 105 |
| Example A34 | 1404 | 1548 | 1548 | 1404 | 91 | 110 | 110 | 110 |
| Example A35 | 1404 | 1308 | 1404 | 1404 | 107 | 100 | 100 | 107 |
| Example A36 | 1404 | 1344 | 1404 | 1404 | 104 | 100 | 100 | 104 |
| Example A37 | 1404 | 1380 | 1404 | 1404 | 102 | 100 | 100 | 102 |
| Example A38 | 1404 | 1464 | 1404 | 1404 | 96 | 100 | 100 | 104 |
| Example A39 | 1404 | 1524 | 1404 | 1404 | 92 | 100 | 100 | 109 |
| Example A40 | 1404 | 1404 | 1404 | 1296 | 100 | 108 | 100 | 108 |
| Example A41 | 1404 | 1404 | 1404 | 1332 | 100 | 105 | 100 | 105 |
| Example A42 | 1404 | 1404 | 1404 | 1428 | 100 | 98 | 100 | 102 |
| Example A43 | 1404 | 1404 | 1404 | 1476 | 100 | 95 | 100 | 105 |
| Example A44 | 1404 | 1404 | 1404 | 1512 | 100 | 93 | 100 | 108 |
| Example A45 | 1308 | 1404 | 1404 | 1308 | 93 | 107 | 107 | 107 |
| Example A46 | 1344 | 1404 | 1404 | 1344 | 96 | 104 | 104 | 104 |
| Example A47 | 1416 | 1404 | 1404 | 1416 | 101 | 99 | 101 | 101 |

TABLE 2-continued

| | | | | | | | | |
|---|---|---|---|---|---|---|---|---|
| Example A48 | 1452 | 1404 | 1404 | 1452 | 103 | 97 | 103 | 103 |
| Example A49 | 1500 | 1404 | 1404 | 1500 | 107 | 94 | 107 | 107 |
| Example A50 | 1284 | 1284 | 1404 | 1284 | 100 | 109 | 109 | 100 |
| Example A51 | 1332 | 1332 | 1404 | 1332 | 100 | 105 | 105 | 100 |
| Example A52 | 1416 | 1416 | 1404 | 1416 | 100 | 99 | 101 | 100 |
| Example A53 | 1452 | 1452 | 1404 | 1452 | 100 | 97 | 103 | 100 |
| Example A54 | 1512 | 1512 | 1404 | 1512 | 100 | 93 | 108 | 100 |

TABLE 3

| | Length (mm) | | | | Width (mm) | | | |
|---|---|---|---|---|---|---|---|---|
| | +series | | −series | | +series | | −series | |
| | Positive electrode | Negative electrode | Positive electrode | Negative electrode | Positive electrode | Negative electrode | Positive electrode | Negative electrode |
| Comparative Example A1 | 124 | 95 | 124 | 95 | 12 | 12 | 12 | 12 |
| Comparative Example A2 | 111 | 95 | 111 | 95 | 12 | 12 | 12 | 12 |
| Comparative Example A3 | 117 | 100 | 117 | 100 | 12 | 12 | 12 | 12 |
| Comparative Example A4 | 117 | 90 | 117 | 90 | 12 | 12 | 12 | 12 |
| Comparative Example A5 | 95 | 95 | 95 | 95 | 16 | 12 | 16 | 12 |
| Comparative Example A6 | 95 | 95 | 95 | 95 | 11 | 12 | 11 | 12 |
| Comparative Example A7 | 95 | 95 | 95 | 95 | 13 | 14 | 13 | 14 |
| Comparative Example A8 | 95 | 95 | 95 | 95 | 13 | 10 | 13 | 10 |
| Comparative Example A9 | 124 | 95 | 124 | 95 | 12 | 12 | 12 | 12 |
| Comparative Example A10 | 111 | 95 | 111 | 95 | 12 | 12 | 12 | 12 |
| Comparative Example A11 | 117 | 100 | 117 | 100 | 12 | 12 | 12 | 12 |
| Comparative Example A12 | 117 | 90 | 117 | 90 | 12 | 12 | 12 | 12 |
| Comparative Example A13 | 95 | 95 | 95 | 95 | 16 | 12 | 16 | 12 |
| Comparative Example A14 | 95 | 95 | 95 | 95 | 11 | 12 | 11 | 12 |
| Comparative Example A15 | 95 | 95 | 95 | 95 | 13 | 14 | 13 | 14 |
| Comparative Example A16 | 95 | 95 | 95 | 95 | 13 | 10 | 13 | 10 |

| | Area (mm$^2$) | | | | Area ratio (%) | | | |
|---|---|---|---|---|---|---|---|---|
| | +series | | −series | | +series | −series | — | — |
| | Positive electrode | Negative electrode | Positive electrode | Negative electrode | Positive/ negative | Positive/ negative | Positive/ positive | Negative/ negative |
| Comparative Example A1 | 1488 | 1140 | 1488 | 1140 | 131 | 131 | 100 | 100 |
| Comparative Example A2 | 1332 | 1140 | 1332 | 1140 | 117 | 117 | 100 | 100 |
| Comparative Example A3 | 1404 | 1200 | 1404 | 1200 | 117 | 117 | 100 | 100 |
| Comparative Example A4 | 1404 | 1080 | 1404 | 1080 | 130 | 130 | 100 | 100 |
| Comparative Example A5 | 1520 | 1140 | 1520 | 1140 | 133 | 133 | 100 | 100 |
| Comparative Example A6 | 1045 | 1140 | 1045 | 1140 | 92 | 92 | 100 | 100 |
| Comparative Example A7 | 1235 | 1330 | 1235 | 1330 | 93 | 93 | 100 | 100 |
| Comparative Example A8 | 1235 | 950 | 1235 | 950 | 130 | 130 | 100 | 100 |
| Comparative Example A9 | 1488 | 1140 | 1488 | 1140 | 131 | 131 | 100 | 100 |
| Comparative Example A10 | 1332 | 1140 | 1332 | 1140 | 117 | 117 | 100 | 100 |

TABLE 3-continued

| | | | | | | | | |
|---|---|---|---|---|---|---|---|---|
| Comparative Example A11 | 1404 | 1200 | 1404 | 1200 | 117 | 117 | 100 | 100 |
| Comparative Example A12 | 1404 | 1080 | 1404 | 1080 | 130 | 130 | 100 | 100 |
| Comparative Example A13 | 1520 | 1140 | 1520 | 1140 | 133 | 133 | 100 | 100 |
| Comparative Example A14 | 1045 | 1140 | 1045 | 1140 | 92 | 92 | 100 | 100 |
| Comparative Example A15 | 1235 | 1330 | 1235 | 1330 | 93 | 93 | 100 | 100 |
| Comparative Example A16 | 1235 | 950 | 1235 | 950 | 130 | 130 | 100 | 100 |

TABLE 4

| | Active material | Average pore diameter (Å) | | Electrolyte | Ion diameter (Å) | | Coefficient A | Coefficient B | Capacity retention (vs initial value) |
|---|---|---|---|---|---|---|---|---|---|
| | | Positive electrode | Negative electrode | | Counteranion | Cation | | | |
| Example A1 | Activated carbon | 13.2 | 12.9 | TEMA-BF$_4$ | 4.9 | 7.24 | 2.69 | 1.78 | 97% |
| Example A2 | Activated carbon | 12.3 | 12.9 | TEMA-BF$_4$ | 4.9 | 7.24 | 2.51 | 1.78 | 95% |
| Example A3 | Activated carbon | 13.6 | 12.9 | TEMA-BF$_4$ | 4.9 | 7.24 | 2.78 | 1.78 | 94% |
| Example A4 | Activated carbon | 13.2 | 12.0 | TEMA-BF$_4$ | 4.9 | 7.24 | 2.69 | 1.66 | 95% |
| Example A5 | Activated carbon | 13.2 | 13.2 | TEMA-BF$_4$ | 4.9 | 7.24 | 2.69 | 1.83 | 95% |
| Example A6 | Activated carbon | 12.3 | 12.9 | TEMA-BF$_4$ | 4.9 | 7.24 | 2.51 | 1.78 | 95% |
| Example A7 | Activated carbon | 13.6 | 12.9 | TEMA-BF$_4$ | 4.9 | 7.24 | 2.78 | 1.78 | 96% |
| Example A8 | Activated carbon | 13.2 | 12.0 | TEMA-BF$_4$ | 4.9 | 7.24 | 2.69 | 1.66 | 94% |
| Example A9 | Activated carbon | 13.2 | 13.2 | TEMA-BF$_4$ | 4.9 | 7.24 | 2.69 | 1.83 | 96% |
| Example A10 | Activated carbon | 13.2 | 14.4 | TEA-BF$_4$ | 4.9 | 8.1 | 2.69 | 1.78 | 88% |
| Example A11 | Activated carbon | 12.3 | 14.4 | TEA-BF$_4$ | 4.9 | 8.1 | 2.51 | 1.78 | 86% |
| Example A12 | Activated carbon | 13.6 | 14.4 | TEA-BF$_4$ | 4.9 | 8.1 | 2.78 | 1.78 | 86% |
| Example A13 | Activated carbon | 13.2 | 13.4 | TEA-BF$_4$ | 4.9 | 8.1 | 2.69 | 1.66 | 85% |
| Example A14 | Activated carbon | 13.2 | 14.8 | TEA-BF$_4$ | 4.9 | 8.1 | 2.69 | 1.83 | 87% |
| Example A15 | Activated carbon | 12.3 | 12.9 | TEMA-BF$_4$ | 4.9 | 7.24 | 2.51 | 1.78 | 85% |
| Example A16 | Activated carbon | 13.6 | 12.9 | TEMA-BF$_4$ | 4.9 | 7.24 | 2.78 | 1.78 | 88% |
| Example A17 | Activated carbon | 13.2 | 12.0 | TEMA-BF$_4$ | 4.9 | 7.24 | 2.69 | 1.66 | 86% |
| Example A18 | Activated carbon | 13.2 | 13.2 | TEMA-BF$_4$ | 4.9 | 7.24 | 2.69 | 1.83 | 85% |

TABLE 5

| | Active material | Average pore diameter (Å) | | Electrolyte | Ion diameter (Å) | | Coefficient A | Coefficient B | Capacity retention (vs initial value) |
|---|---|---|---|---|---|---|---|---|---|
| | | Positive electrode | Negative electrode | | Counteranion | Cation | | | |
| Example A19 | Activated carbon | 13.2 | 12.9 | TEMA-BF$_4$ | 4.9 | 7.24 | 2.69 | 1.78 | 99% |
| Example A20 | Activated carbon | 13.2 | 12.9 | TEMA-BF$_4$ | 4.9 | 7.24 | 2.69 | 1.78 | 97% |
| Example A21 | Activated carbon | 13.2 | 12.9 | TEMA-BF$_4$ | 4.9 | 7.24 | 2.69 | 1.78 | 95% |
| Example A22 | Activated carbon | 13.2 | 12.9 | TEMA-BF$_4$ | 4.9 | 7.24 | 2.69 | 1.78 | 92% |
| Example A23 | Activated carbon | 13.2 | 12.9 | TEMA-BF$_4$ | 4.9 | 7.24 | 2.69 | 1.78 | 96% |

TABLE 5-continued

| | Active material | Average pore diameter (Å) Positive electrode | Average pore diameter (Å) Negative electrode | Electrolyte | Ion diameter (Å) Counteranion | Ion diameter (Å) Cation | Coefficient A | Coefficient B | Capacity retention (vs initial value) |
|---|---|---|---|---|---|---|---|---|---|
| Example A24 | Activated carbon | 13.2 | 12.9 | TEMA-BF$_4$ | 4.9 | 7.24 | 2.69 | 1.78 | 97% |
| Example A25 | Activated carbon | 13.2 | 12.9 | TEMA-BF$_4$ | 4.9 | 7.24 | 2.69 | 1.78 | 92% |
| Example A26 | Activated carbon | 13.2 | 12.9 | TEMA-BF$_4$ | 4.9 | 7.24 | 2.69 | 1.78 | 97% |
| Example A27 | Activated carbon | 13.2 | 12.9 | TEMA-BF$_4$ | 4.9 | 7.24 | 2.69 | 1.78 | 98% |
| Example A28 | Activated carbon | 13.2 | 12.9 | TEMA-BF$_4$ | 4.9 | 7.24 | 2.69 | 1.78 | 96% |
| Example A29 | Activated carbon | 13.2 | 12.9 | TEMA-BF$_4$ | 4.9 | 7.24 | 2.69 | 1.78 | 92% |
| Example A30 | Activated carbon | 13.2 | 12.9 | TEMA-BF$_4$ | 4.9 | 7.24 | 2.69 | 1.78 | 93% |
| Example A31 | Activated carbon | 13.2 | 12.9 | TEMA-BF$_4$ | 4.9 | 7.24 | 2.69 | 1.78 | 96% |
| Example A32 | Activated carbon | 13.2 | 12.9 | TEMA-BF$_4$ | 4.9 | 7.24 | 2.69 | 1.78 | 98% |
| Example A33 | Activated carbon | 13.2 | 12.9 | TEMA-BF$_4$ | 4.9 | 7.24 | 2.69 | 1.78 | 95% |
| Example A34 | Activated carbon | 13.2 | 12.9 | TEMA-BF$_4$ | 4.9 | 7.24 | 2.69 | 1.78 | 90% |
| Example A35 | Activated carbon | 13.2 | 12.9 | TEMA-BF$_4$ | 4.9 | 7.24 | 2.69 | 1.78 | 89% |
| Example A36 | Activated carbon | 13.2 | 12.9 | TEMA-BF$_4$ | 4.9 | 7.24 | 2.69 | 1.78 | 96% |
| Example A37 | Activated carbon | 13.2 | 12.9 | TEMA-BF$_4$ | 4.9 | 7.24 | 2.69 | 1.78 | 99% |
| Example A38 | Activated carbon | 13.2 | 12.9 | TEMA-BF$_4$ | 4.9 | 7.24 | 2.69 | 1.78 | 97% |
| Example A39 | Activated carbon | 13.2 | 12.9 | TEMA-BF$_4$ | 4.9 | 7.24 | 2.69 | 1.78 | 91% |
| Example A40 | Activated carbon | 13.2 | 12.9 | TEMA-BF$_4$ | 4.9 | 7.24 | 2.69 | 1.78 | 89% |
| Example A41 | Activated carbon | 13.2 | 12.9 | TEMA-BF$_4$ | 4.9 | 7.24 | 2.69 | 1.78 | 96% |
| Example A42 | Activated carbon | 13.2 | 12.9 | TEMA-BF$_4$ | 4.9 | 7.24 | 2.69 | 1.78 | 99% |
| Example A43 | Activated carbon | 13.2 | 12.9 | TEMA-BF$_4$ | 4.9 | 7.24 | 2.69 | 1.78 | 97% |
| Example A44 | Activated carbon | 13.2 | 12.9 | TEMA-BF$_4$ | 4.9 | 7.24 | 2.69 | 1.78 | 92% |
| Example A45 | Activated carbon | 13.2 | 12.9 | TEMA-BF$_4$ | 4.9 | 7.24 | 2.69 | 1.78 | 91% |
| Example A46 | Activated carbon | 13.2 | 12.9 | TEMA-BF$_4$ | 4.9 | 7.24 | 2.69 | 1.78 | 97% |
| Example A47 | Activated carbon | 13.2 | 12.9 | TEMA-BF$_4$ | 4.9 | 7.24 | 2.69 | 1.78 | 98% |
| Example A48 | Activated carbon | 13.2 | 12.9 | TEMA-BF$_4$ | 4.9 | 7.24 | 2.69 | 1.78 | 96% |
| Example A49 | Activated carbon | 13.2 | 12.9 | TEMA-BF$_4$ | 4.9 | 7.24 | 2.69 | 1.78 | 91% |
| Example A50 | Activated carbon | 13.2 | 12.9 | TEMA-BF$_4$ | 4.9 | 7.24 | 2.69 | 1.78 | 90% |
| Example A51 | Activated carbon | 13.2 | 12.9 | TEMA-BF$_4$ | 4.9 | 7.24 | 2.69 | 1.78 | 97% |
| Example A52 | Activated carbon | 13.2 | 12.9 | TEMA-BF$_4$ | 4.9 | 7.24 | 2.69 | 1.78 | 99% |
| Example A53 | Activated carbon | 13.2 | 12.9 | TEMA-BF$_4$ | 4.9 | 7.24 | 2.69 | 1.78 | 98% |
| Example A54 | Activated carbon | 13.2 | 12.9 | TEMA-BF$_4$ | 4.9 | 7.24 | 2.69 | 1.78 | 89% |

TABLE 6

| | Active material | Average pore diameter (Å) Positive electrode | Average pore diameter (Å) Negative electrode | Electrolyte | Ion diameter (Å) Counteranion | Ion diameter (Å) Cation | Coefficient A | Coefficient B | Capacity retention (vs initial value) |
|---|---|---|---|---|---|---|---|---|---|
| Comparative Example A1 | Activated carbon | 12.2 | 12.9 | TEMA-BF$_4$ | 4.9 | 7.24 | 2.48 | 1.78 | 78% |
| Comparative Example A2 | Activated carbon | 13.8 | 12.9 | TEMA-BF$_4$ | 4.9 | 7.24 | 2.82 | 1.78 | 77% |
| Comparative Example A3 | Activated carbon | 13.2 | 11.8 | TEMA-BF$_4$ | 4.9 | 7.24 | 2.69 | 1.63 | 75% |
| Comparative Example A4 | Activated carbon | 13.2 | 13.5 | TEMA-BF$_4$ | 4.9 | 7.24 | 2.69 | 1.87 | 76% |
| Comparative Example A5 | Activated carbon | 12.2 | 12.9 | TEMA-BF$_4$ | 4.9 | 7.24 | 2.48 | 1.78 | 76% |
| Comparative Example A6 | Activated carbon | 13.8 | 12.9 | TEMA-BF$_4$ | 4.9 | 7.24 | 2.82 | 1.78 | 75% |
| Comparative Example A7 | Activated carbon | 13.2 | 11.8 | TEMA-BF$_4$ | 4.9 | 7.24 | 2.69 | 1.63 | 73% |
| Comparative Example A8 | Activated carbon | 13.2 | 13.5 | TEMA-BF$_4$ | 4.9 | 7.24 | 2.69 | 1.87 | 76% |
| Comparative Example A9 | Activated carbon | 12.2 | 12.9 | TEMA-BF$_4$ | 4.9 | 7.24 | 2.48 | 1.78 | 70% |
| Comparative Example A10 | Activated carbon | 13.8 | 12.9 | TEMA-BF$_4$ | 4.9 | 7.24 | 2.82 | 1.78 | 72% |
| Comparative Example A11 | Activated carbon | 13.2 | 11.8 | TEMA-BF$_4$ | 4.9 | 7.24 | 2.69 | 1.63 | 69% |
| Comparative Example A12 | Activated carbon | 13.2 | 13.5 | TEMA-BF$_4$ | 4.9 | 7.24 | 2.69 | 1.87 | 72% |
| Comparative Example A13 | Activated carbon | 12.2 | 12.9 | TEMA-BF$_4$ | 4.9 | 7.24 | 2.48 | 1.78 | 73% |

TABLE 6-continued

| | Active material | Average pore diameter (Å) | | Ion diameter (Å) | | | | Capacity retention (vs initial value) |
| | | Positive electrode | Negative electrode | Electrolyte | Counteranion | Cation | Coefficient A | Coefficient B | |
|---|---|---|---|---|---|---|---|---|---|
| Comparative Example A14 | Activated carbon | 13.8 | 12.9 | TEMA-BF$_4$ | 4.9 | 7.24 | 2.82 | 1.78 | 70% |
| Comparative Example A15 | Activated carbon | 13.2 | 11.8 | TEMA-BF$_4$ | 4.9 | 7.24 | 2.69 | 1.63 | 68% |
| Comparative Example A16 | Activated carbon | 13.2 | 13.5 | TEMA-BF$_4$ | 4.9 | 7.24 | 2.69 | 1.87 | 71% |

Example B1

Activated carbon particles (manufactured by Kuraray Chemical Co., LTD., trade name: RP-20) as an active material and PVDF as a binder were mixed in a mass ratio of active material:binder=70:30. N-methylpyrrolidone was added to the obtained mixture, and the -mixture was kneaded to prepare an application liquid. Next, the above application liquid was applied on both surfaces of aluminum foil (thickness: 20 μm) by a doctor blade method and dried to obtain a sheet having active material layers with a thickness of 20 μm laminated on both surfaces thereof. Then, four strip-like electrodes on which a lead connection tab was provided were punched out of the above sheets so that the length and width of the active material layers were values in Table 7, and leads of aluminum foil (thickness: 100 μm) were connected to the tabs of these electrodes by ultrasonic welding.

Next, both surfaces of one electrode was covered with a regenerated cellulose nonwoven fabric (thickness: 30 μm, size: 14 mm×195 mm) as a separator. Then, the electrode was opposed to the other electrode, and they were heated and pressurized at 100° C. at 1 kg/cm$^2$ for 10 seconds to obtain a strip-like laminate. This laminate was cylindrically wound from its end, and the winding end portion was fastened by a winding fastening tape to obtain a winding type electrode body. Another winding type electrode body was similarly fabricated using the remaining two electrodes.

Next, an exterior body made of an aluminum laminate film having an opening on one side and having its interior divided into two spaces by a partition was prepared. Then, the above electrode bodies were housed one by one in the two spaces, and then, an electrolyte solution was injected into the interior of the exterior body from the opening. The electrolyte solution was one in which tetraethylammonium tetrafluoroborate (TEA$^+$BF$_4$$^-$) as an electrolyte was dissolved in propylene carbonate (PC) as an organic solvent, and the electrolyte concentration in the electrolyte solution was 1.0 mol/L.

Next, the leads connected to the electrode bodies were taken out from the opening of the exterior body, and the opening of the laminate film was heat sealed, with the leads sandwiched, using polypropylene as a sealing member to hermetically seal the exterior body. Then, a pair of the leads connected to the electrodes having different polarities in the two electrode bodies were electrically connected outside the exterior body to connect the two electrode bodies in series. In this manner, an electric double layer capacitor having a size of 20 mm×20 mm×27 mm and having the active material layers with the length and width in Table 7 on both surfaces of the current collectors was obtained.

Examples B2 to B19 and Comparative Examples B1 to B13

Electric double layer capacitors in. Examples B2 to B19 and Comparative Examples B1 to B13 were obtained as in Example B1, except that the length and width of the active material layers were changed to values in the Examples and the Comparative Examples in Table 7.

Examples B20 to B24 and Comparative Examples B14 to B16

The length and width of the active material layers were changed to values in Examples and Comparative Examples in Table 9, and three electrode bodies were fabricated as in Example B1. Also, the electrode bodies were housed one by one in three spaces of an exterior body made of an aluminum laminate film having its interior divided into the three spaces by a partition. Further, the leads connected to the three electrode bodies were electrically connected outside the exterior body to connect the three electrode bodies in series. Except these, electric double layer capacitors in Examples B20 to B24 and Comparative Examples B14 to B16 having the active material layers with the length and width in Table 9 on both surfaces of the current collectors were obtained as in Example B1.

<Calculation of Area Ratio>

For Examples B1 to B19 and Comparative Examples B1 to B13, each of the area of one surfaces of the active material layers of the positive electrodes and the negative electrodes was calculated using the values of the length and width of the active material layers in the two electrode bodies (labeled as "+ series" and "− series" in Tables 7 and 8). It was assumed that the negative electrode of the "+ series" electrode body and the positive electrode of the "− series" electrode body were electrically connected. Then, the ratio of the area of the active material layers of the positive electrode to the area of the active material layers of the negative electrode in each of the "+ series" and "− series" electrode bodies, the ratio of the maximum value to the minimum value of the area of the active material layers of the positive electrodes in the "+ series" and "− series" electrode bodies, and the ratio of the maximum value to the minimum value of the area of the active material layers of the negative electrodes in the "+ series" and "− series" electrode bodies were calculated. The results are shown in Table 7.

For Examples B20 to B24 and Comparative Examples B14 to B16, each of the area of one surfaces of the active material layers of the positive electrodes and the negative electrodes was calculated, as shown in Table 9, using the values of the length and width of the active material layers in the three electrode bodies (labeled as "series 1," "series 2," and "series 3" in Tables 9 to 11). It was assumed that the negative electrode of the "series 1" electrode body and the positive electrode of the "series 2" electrode body were electrically connected, and that the negative electrode of the "series 2" electrode body and the positive electrode of the "series 3" electrode body were electrically connected. Then, the ratio of the area of the active material layers of the positive electrode to the area of the active material layers of the negative electrode in each of the "series 1" to "series 3" electrode bodies, the ratio of the maximum value to the minimum value of the area of the active material layers of the positive electrodes in the "series 1" to "series 3" electrode bodies, and the ratio of the maximum value to the minimum value of the area of the active material layers of the negative electrodes in the "series 1" to "series 3" electrode bodies were calculated. The results are shown in Table 10.

In all the above Examples and Comparative Examples, each electrode has the active material layers on both surfaces of the current collector respectively, and therefore, the area of the active material layers of each electrode used for the calculation of the area ratio is the total value of the area of both surfaces of the active material layers. But, since the area of both surfaces of the active material layers of each electrode is equal to each other in all Examples and Comparative Examples, the result is the same whether the total value of both surfaces is used or the value of one surface is used for the area of the active material layers of each electrode used for the calculation of the area ratio.

<Holding Voltage Measurement>

The electric double layer capacitors in Examples B1 to B19 and Comparative Examples B1 to B13 were charged at 5 V for 1 hour and left for 2 hours. Then, the total voltage ($V_t$) of the electrode bodies connected in series, and the voltage ($V_p$ and $V_m$) of each electrode body were measured, and the voltage balance ($=V_p/(V_t/2)$) was calculated. The results are shown in Table 8.

The electric double layer capacitors in Examples B20 to B24 and Comparative Examples B14 to B16 were charged at 7.5 V for 1 hour and left for 2 hours. Then, the total voltage ($V_t$) of the electrode bodies connected in series, and the voltage of each electrode body were measured. Also, (maximum value of voltage of "series 1" to "series 3")/($V_t/3$), and (minimum value of voltage of "series 1" to "series 3")/($V_t/3$) were calculated as the voltage balance. The results are shown in Table 11.

<Impedance Measurement>

For the electric double layer capacitors in Examples B1 to B19 and Comparative Examples B1 to B13, the impedance value ($I_0$) before charge and discharge was measured. Then, after the step of performing constant current constant voltage charge (CC-CV charge) at 1 A up to 5.7 V for 5 seconds and performing CC-CV discharge at 3 A up to 0 V for 5 seconds, as 1 cycle, was performed for 5000 cycles, the impedance value (I) was measured. The impedance value was measured at a frequency of 1 KHz using Solartron (trade name, manufactured by TOYO Corporation) at 25° C. A change in impedance value ($=I/I_0 \times 100$) is shown in Table 8.

For the electric double layer capacitors in Examples B20 to B24 and Comparative Examples B14 to B16, the impedance value ($I_0$) before charge and discharge was measured. Then, after the step of performing constant current constant voltage charge (CC-CV charge) at 1 A up to 8.5 V for 8 seconds and performing CC-CV discharge at 3 A up to 0 V for 8 seconds, as 1 cycle, was performed for 5000 cycles, the impedance value (I) was measured. The impedance value was measured at a frequency of 1 KHz using Solartron (trade name, manufactured by TOYO Corporation) at 25° C. A change in impedance value ($=I/I_0 \times 100$) is shown in Table 11.

<Overall Evaluation>

A case where all voltage balances were in the range of 0.95 to 1.05 and the change in impedance value was within 150% was labeled as "A" as good, and a case where both or one was not satisfied was labeled as "B." The evaluation results are shown in Tables 8 and 11.

TABLE 7

| | Length (mm) | | | | Width (mm) | | | |
| --- | --- | --- | --- | --- | --- | --- | --- | --- |
| | +series | | −series | | +series | | −series | |
| | Positive electrode | Negative electrode | Positive electrode | Negative electrode | Positive electrode | Negative electrode | Positive electrode | Negative electrode |
| Example B1 | 117 | 95 | 117 | 95 | 12 | 12 | 12 | 12 |
| Example B2 | 95 | 117 | 95 | 117 | 12 | 12 | 12 | 12 |
| Example B3 | 145 | 120 | 145 | 120 | 12 | 12 | 12 | 12 |
| Example B4 | 120 | 145 | 120 | 145 | 12 | 12 | 12 | 12 |
| Example B5 | 102 | 80 | 102 | 80 | 10 | 10 | 10 | 10 |
| Example B6 | 80 | 102 | 80 | 102 | 10 | 10 | 10 | 10 |
| Example B7 | 95 | 95 | 95 | 95 | 10 | 10 | 10 | 10 |
| Example B8 | 95 | 95 | 95 | 95 | 12 | 10 | 12 | 10 |
| Example B9 | 95 | 95 | 95 | 95 | 10 | 12 | 10 | 12 |
| Example B10 | 95 | 95 | 95 | 95 | 15 | 12 | 15 | 12 |
| Example B11 | 95 | 95 | 95 | 95 | 12 | 15 | 12 | 15 |
| Example B12 | 100 | 94 | 97 | 94 | 12 | 12 | 12 | 12 |
| Example B13 | 100 | 94 | 96 | 94 | 12 | 12 | 12 | 12 |
| Example B14 | 100 | 96 | 100 | 94 | 12 | 12 | 12 | 12 |
| Example B15 | 102 | 97 | 100 | 94 | 12 | 12 | 12 | 12 |
| Example B16 | 100 | 98 | 100 | 94 | 12 | 12 | 12 | 12 |
| Example B17 | 97 | 90 | 100 | 94 | 12 | 12 | 12 | 12 |
| Example B18 | 97 | 94 | 100 | 94 | 12 | 12 | 12 | 12 |
| Example B19 | 100 | 92 | 100 | 94 | 12 | 12 | 12 | 12 |
| Comparative Example B1 | 117 | 95 | 95 | 117 | 12 | 12 | 12 | 12 |
| Comparative Example B2 | 95 | 117 | 117 | 95 | 12 | 12 | 12 | 12 |
| Comparative Example B3 | 145 | 120 | 120 | 145 | 12 | 12 | 12 | 12 |

TABLE 7-continued

| | | | | | | | | |
|---|---|---|---|---|---|---|---|---|
| Comparative Example B4 | 120 | 145 | 145 | 120 | 12 | 12 | 12 | 12 |
| Comparative Example B5 | 102 | 78 | 78 | 102 | 10 | 10 | 10 | 10 |
| Comparative Example B6 | 78 | 102 | 102 | 78 | 10 | 10 | 10 | 10 |
| Comparative Example B7 | 95 | 95 | 95 | 95 | 16 | 12 | 16 | 12 |
| Comparative Example B8 | 95 | 95 | 95 | 95 | 12 | 16 | 12 | 16 |
| Comparative Example B9 | 100 | 94 | 94 | 94 | 12 | 12 | 12 | 12 |
| Comparative Example B10 | 94 | 100 | 94 | 94 | 12 | 12 | 12 | 12 |
| Comparative Example B11 | 95 | 95 | 103 | 95 | 12 | 12 | 12 | 12 |
| Comparative Example B12 | 95 | 95 | 95 | 107 | 12 | 12 | 12 | 12 |
| Comparative Example B13 | 100 | 100 | 100 | 100 | 12 | 12.7 | 12 | 12 |

| | Area (mm$^2$) | | | | Area ratio (%) | | | |
|---|---|---|---|---|---|---|---|---|
| | +series | | −series | | +series | −series | | |
| | Positive electrode | Negative electrode | Positive electrode | Negative electrode | Positive/ negative | Positive/ negative | Positive/ positive | Negative/ negative |
| Example B1 | 1404 | 1140 | 1404 | 1140 | 123 | 123 | 100 | 100 |
| Example B2 | 1140 | 1404 | 1140 | 1404 | 81 | 81 | 100 | 100 |
| Example B3 | 1740 | 1440 | 1740 | 1440 | 121 | 121 | 100 | 100 |
| Example B4 | 1440 | 1740 | 1440 | 1740 | 83 | 83 | 100 | 100 |
| Example B5 | 1020 | 800 | 1020 | 800 | 128 | 128 | 100 | 100 |
| Example B6 | 800 | 1020 | 800 | 1020 | 78 | 78 | 100 | 100 |
| Example B7 | 950 | 950 | 950 | 950 | 100 | 100 | 100 | 100 |
| Example B8 | 1140 | 950 | 1140 | 950 | 120 | 120 | 100 | 100 |
| Example B9 | 950 | 1140 | 950 | 1140 | 83 | 83 | 100 | 100 |
| Example B10 | 1425 | 1140 | 1425 | 1140 | 125 | 125 | 100 | 100 |
| Example B11 | 1140 | 1425 | 1140 | 1425 | 80 | 80 | 100 | 100 |
| Example B12 | 1200 | 1128 | 1164 | 1128 | 106 | 103 | 103 | 100 |
| Example B13 | 1200 | 1128 | 1152 | 1128 | 106 | 102 | 104 | 100 |
| Example B14 | 1200 | 1152 | 1200 | 1128 | 104 | 106 | 100 | 102 |
| Example B15 | 1224 | 1164 | 1200 | 1128 | 105 | 106 | 102 | 103 |
| Example B16 | 1200 | 1176 | 1200 | 1128 | 102 | 106 | 100 | 104 |
| Example B17 | 1164 | 1080 | 1200 | 1128 | 108 | 106 | 103 | 104 |
| Example B18 | 1164 | 1128 | 1200 | 1128 | 103 | 106 | 103 | 100 |
| Example B19 | 1200 | 1104 | 1200 | 1128 | 109 | 106 | 100 | 102 |
| Comparative Example B1 | 1404 | 1140 | 1140 | 1404 | 123 | 81 | 123 | 123 |
| Comparative Example B2 | 1140 | 1404 | 1404 | 1140 | 81 | 123 | 123 | 123 |
| Comparative Example B3 | 1740 | 1440 | 1440 | 1740 | 121 | 83 | 121 | 121 |
| Comparative Example B4 | 1440 | 1740 | 1740 | 1440 | 83 | 121 | 121 | 121 |
| Comparative Example B5 | 1020 | 780 | 780 | 1020 | 131 | 76 | 131 | 131 |
| Comparative Example B6 | 780 | 1020 | 1020 | 780 | 76 | 131 | 131 | 131 |
| Comparative Example B7 | 1520 | 1140 | 1520 | 1140 | 133 | 133 | 100 | 100 |
| Comparative Example B8 | 1140 | 1520 | 1140 | 1520 | 75 | 75 | 100 | 100 |
| Comparative Example B9 | 1200 | 1128 | 1128 | 1128 | 106 | 100 | 106 | 100 |
| Comparative Example B10 | 1128 | 1200 | 1128 | 1128 | 94 | 100 | 100 | 106 |
| Comparative Example B11 | 1140 | 1140 | 1236 | 1140 | 100 | 108 | 108 | 100 |
| Comparative Example B12 | 1140 | 1140 | 1140 | 1284 | 100 | 89 | 100 | 113 |
| Comparative Example B13 | 1200 | 1270 | 1200 | 1200 | 94 | 100 | 100 | 106 |

TABLE 8

| | Holding voltage (V) (total) Vt | Holding voltage (V) (+series) Vp | Holding voltage (V) (−series) Vm | Voltage balance (V) Vp/(Vt/2) | Impedance change (%) vs initial value | Overall evaluation |
|---|---|---|---|---|---|---|
| Example B1 | 4.68 | 2.33 | 2.35 | 1.00 | 101 | A |
| Example B2 | 4.49 | 2.27 | 2.22 | 1.01 | 101 | A |
| Example B3 | 4.50 | 2.24 | 2.26 | 1.00 | 101 | A |
| Example B4 | 4.38 | 2.19 | 2.19 | 1.00 | 101 | A |
| Example B5 | 4.56 | 2.37 | 2.29 | 1.04 | 105 | A |
| Example B6 | 4.44 | 2.31 | 2.13 | 1.04 | 107 | A |
| Example B7 | 4.60 | 2.31 | 2.29 | 1.00 | 101 | A |
| Example B8 | 4.66 | 2.31 | 2.35 | 0.99 | 103 | A |
| Example B9 | 4.48 | 2.25 | 2.23 | 1.00 | 104 | A |
| Example B10 | 4.53 | 2.26 | 2.27 | 1.00 | 105 | A |
| Example B11 | 4.48 | 2.33 | 2.15 | 1.04 | 104 | A |
| Example B12 | 4.60 | 2.32 | 2.28 | 1.01 | 108 | A |
| Example B13 | 4.53 | 2.17 | 2.36 | 0.96 | 110 | A |
| Example B14 | 4.48 | 2.28 | 2.20 | 1.02 | 106 | A |
| Example B15 | 4.52 | 2.29 | 2.23 | 1.01 | 105 | A |
| Example B16 | 4.48 | 2.32 | 2.16 | 1.04 | 111 | A |
| Example B17 | 4.45 | 2.22 | 2.23 | 1.00 | 103 | A |
| Example B18 | 4.51 | 2.29 | 2.22 | 1.02 | 108 | A |
| Example B19 | 4.55 | 2.25 | 2.30 | 0.99 | 106 | A |
| Comparative Example B1 | 4.54 | 2.08 | 2.46 | 0.92 | 185 | B |
| Comparative Example B2 | 4.53 | 2.45 | 2.08 | 1.08 | 180 | B |
| Comparative Example B3 | 4.30 | 1.95 | 2.35 | 0.91 | 172 | B |
| Comparative Example B4 | 4.33 | 2.31 | 2.02 | 1.07 | 175 | B |
| Comparative Example B5 | 4.48 | 2.11 | 2.37 | 0.94 | 200 | B |
| Comparative Example B6 | 4.45 | 2.36 | 2.09 | 1.06 | 203 | B |
| Comparative Example B7 | 4.50 | 2.12 | 2.38 | 0.94 | 165 | B |
| Comparative Example B8 | 4.42 | 2.39 | 2.03 | 1.08 | 178 | B |
| Comparative Example B9 | 4.48 | 2.11 | 2.37 | 0.94 | 189 | B |
| Comparative Example B10 | 4.45 | 2.35 | 2.10 | 1.06 | 168 | B |
| Comparative Example B11 | 4.46 | 2.39 | 2.17 | 1.07 | 162 | B |
| Comparative Example B12 | 4.49 | 2.11 | 2.38 | 0.94 | 182 | B |
| Comparative Example B13 | 4.44 | 2.35 | 2.09 | 1.06 | 170 | B |

TABLE 9

| | Length (mm) | | | | | | Width (mm) | | | |
|---|---|---|---|---|---|---|---|---|---|---|
| | series 1 | | series 2 | | series 3 | | series 1 | | series 2 | |
| | Positive electrode | Negative electrode | Positive electrode | Negative electrode | Positive electrode | Negative electrode | Positive electrode | Negative electrode | Positive electrode | Negative electrode |
| Example B20 | 117 | 95 | 117 | 95 | 117 | 95 | 12 | 12 | 12 | 12 |
| Example B21 | 95 | 117 | 95 | 117 | 95 | 117 | 12 | 12 | 12 | 12 |
| Example B22 | 115 | 95 | 113 | 95 | 117 | 95 | 12 | 12 | 12 | 12 |
| Example B23 | 117 | 95 | 118 | 95 | 117 | 93 | 12 | 12 | 12 | 12 |
| Example B24 | 117 | 96 | 117 | 95 | 117 | 93 | 12 | 12 | 12 | 12 |
| Comparative Example B14 | 117 | 95 | 95 | 117 | 117 | 95 | 12 | 12 | 12 | 12 |
| Comparative Example B15 | 117 | 92 | 117 | 95 | 117 | 99 | 12 | 12 | 12 | 12 |
| Comparative Example B16 | 120 | 95 | 117 | 95 | 110 | 95 | 12 | 12 | 12 | 12 |

TABLE 9-continued

|  | Width (mm) | | Area (mm²) | | | | | |
|---|---|---|---|---|---|---|---|---|
|  | series 3 | | series 1 | | series 2 | | series 3 | |
|  | Positive electrode | Negative electrode | Positive electrode | Negative electrode | Positive electrode | Negative electrode | Positive electrode | Negative electrode |
| Example B20 | 12 | 12 | 1404 | 1140 | 1404 | 1140 | 1404 | 1140 |
| Example B21 | 12 | 12 | 1140 | 1404 | 1140 | 1404 | 1140 | 1404 |
| Example B22 | 12 | 12 | 1380 | 1140 | 1356 | 1140 | 1404 | 1140 |
| Example B23 | 12 | 12 | 1404 | 1140 | 1416 | 1140 | 1404 | 1116 |
| Example B24 | 12 | 12 | 1404 | 1152 | 1404 | 1140 | 1404 | 1116 |
| Comparative Example B14 | 12 | 12 | 1404 | 1140 | 1140 | 1404 | 1404 | 1140 |
| Comparative Example B15 | 12 | 12 | 1404 | 1104 | 1404 | 1140 | 1404 | 1188 |
| Comparative Example B16 | 12 | 12 | 1440 | 1140 | 1404 | 1140 | 1320 | 1140 |

TABLE 10

|  | Area ratio (%) | | | | |
|---|---|---|---|---|---|
|  | series 1 Positive/ negative | series 2 Positive/ negative | series 3 Positive/ negative | (Maximum area)/ (minimum area) Positive electrode | (Maximum area)/ (minimum area) Negative electrode |
| Example B20 | 123 | 123 | 123 | 100 | 100 |
| Example B21 | 81 | 81 | 81 | 100 | 100 |
| Example B22 | 121 | 119 | 123 | 104 | 100 |
| Example B23 | 123 | 124 | 126 | 101 | 102 |
| Example B24 | 122 | 123 | 126 | 100 | 103 |
| Comparative Example B14 | 123 | 81 | 123 | 123 | 123 |
| Comparative Example B15 | 127 | 123 | 118 | 100 | 108 |
| Comparative Example B16 | 126 | 123 | 116 | 109 | 100 |

TABLE 11

|  | Holding voltage (V) (total) Vt | Holding voltage (V) (series 1) | Holding voltage (V) (series 2) | Holding voltage (V) (series 3) | Voltage balance (V) Vmax/(Vt/3) | Voltage balance (V) Vmin/(Vt/3) | Impedance change (%) vs initial value | Overall evaluation |
|---|---|---|---|---|---|---|---|---|
| Example B20 | 7.06 | 2.35 | 2.38 | 2.33 | 1.01 | 0.99 | 101 | A |
| Example B21 | 6.96 | 2.30 | 2.33 | 2.33 | 1.00 | 0.99 | 104 | A |
| Example B22 | 7.01 | 2.34 | 2.27 | 2.40 | 1.03 | 0.97 | 107 | A |
| Example B23 | 6.90 | 2.28 | 2.30 | 2.32 | 1.01 | 0.99 | 103 | A |
| Example B24 | 6.88 | 2.22 | 2.28 | 2.38 | 1.04 | 0.97 | 108 | A |
| Comparative Example B14 | 6.80 | 2.19 | 2.49 | 2.12 | 1.10 | 0.94 | 177 | B |
| Comparative Example B15 | 6.83 | 2.43 | 2.27 | 2.13 | 1.07 | 0.94 | 175 | B |
| Comparative Example B16 | 6.82 | 2.46 | 2.22 | 2.14 | 1.08 | 0.94 | 189 | B |

What is claimed is:

1. An electric double layer capacitor comprising:
an external casing;
a plurality of electrode bodies within the external casing, the plurality of electrode bodies including a first electrode body and a second electrode body, each electrode body including a positive electrode and a negative electrode laminated via a separator, the positive electrode and the negative electrode having an active material layer formed on a current collector; and
a partition that separates the first electrode body and the second electrode body, the partition extending into an opening in the external casing, wherein
the plurality of the electrode bodies are electrically connected in series,
in each of the plurality of the electrode bodies, a ratio of an area of the active material layer of the positive electrode to an area of the active material layer of the negative electrode is in the range of 102 to 128%,
in the plurality of the electrode bodies, a ratio of a maximum value of an area of the active material layers of the positive electrodes to a minimum value of an area of the active material layers of the positive electrodes is 105% or less, in the plurality of the electrode bodies, a ratio of a maximum value of an area of the active material layers of the negative electrodes to a minimum value of an area of the active material layers of the negative electrodes is 105% or less, the opening is sealed with a sealing member that surrounds the partition so as to seal the interior of the capacitor from the exterior of the external casing, and an end of the partition is aligned with an outer surface of the sealing member.

2. The electric double layer capacitor of claim 1, wherein at least one of the electrode bodies is a wound body.

3. The electric double layer capacitor of claim 1, wherein each of the first electrode body and the second electrode body is wound in an elliptical shape with flat portions parallel to the partition.

4. An electric double layer capacitor comprising:
a first electrode body;
a second electrode body;
an external casing that hermetically seals the first electrode body and the second electrode body within the external casing;
a partition that separates a first internal space of the external casing from a second internal space of the external casing, the partition extending into an opening in the external casing, and the first electrode body positioned in the first internal space and the second electrode body positioned in the second internal space; and
a pair of leads electrically connecting the first electrode body and the second electrode body in series, wherein
each of the first electrode body and the second electrode body includes a separator sandwiched between a positive electrode and a negative electrode,
each of the positive electrode and the negative electrode of each of the first electrode body and the second electrode body includes a current collector layer sandwiched between a first active material layer and a second active material layer,
the pair of leads includes a first lead and a second lead in contact outside of the external casing, the first lead being electrically connected to the current collector of the positive electrode of the first electrode body, and the second lead being electrically connected to the current collector of negative electrode of the second electrode body, and
in each of the first electrode body and the second electrode body,
a ratio of an area of the active material layer of the positive electrode to an area of the active material layer of the negative electrode is in the range of 102 to 128%,
a ratio of a maximum value of an area of the active material layers of the positive electrodes to a minimum value of an area of the active material layers of the positive electrodes is 105% or less, and a ratio of a maximum value of an area of the active material layers of the negative electrodes to a minimum value of an area of the active material layers of the negative electrodes is 105% or less.

5. The electric double layer capacitor of claim 4, wherein at least one of the electrode bodies is a wound body.

6. The electric double layer capacitor of claim 4, wherein each of the first electrode body and the second electrode body is wound in an elliptical shape with flat portions parallel to the partition.

7. The electric double layer capacitor of claim 4, wherein the pair of leads extends through the opening in the external casing, and the opening is sealed with a sealing member that surrounds the first lead, the second lead, and the partition so as to seal the interior of the capacitor from the exterior of the external casing while keeping the partition separate from the first lead and the second lead.

8. An electric double layer capacitor comprising:
an external casing;
a plurality of electrode bodies within the external casing, the plurality of electrode bodies including a first electrode body and a second electrode body, each electrode body including a positive electrode and a negative electrode laminated via a separator, the positive electrode and the negative electrode having an active material layer formed on a current collector; and
a partition that separates the first electrode body and the second electrode body, the partition extending into an opening in the external casing, wherein
the plurality of the electrode bodies are electrically connected in series,
in each of the plurality of the electrode bodies, a ratio of an area of the active material layer of the positive electrode to an area of the active material layer of the negative electrode is in the range of 102 to 128%,
in the plurality of the electrode bodies, a ratio of a maximum value of an area of the active material layers of the positive electrodes to a minimum value of an area of the active material layers of the positive electrodes is 105% or less,
in the plurality of the electrode bodies, a ratio of a maximum value of an area of the active material layers of the negative electrodes to a minimum value of an area of the active material layers of the negative electrodes is 105% or less, and
an end of the partition is aligned with an edge of the external casing.

9. The electric double layer capacitor of claim 8, wherein at least one of the electrode bodies is a wound body.

10. The electric double layer capacitor of claim 8, wherein each of the first electrode body and the second electrode body is wound in an elliptical shape with flat portions parallel to the partition.

11. The electric double layer capacitor of claim 8, wherein the opening is sealed with a sealing member that surrounds the partition so as to seal the interior of the capacitor from the exterior of the external casing.

* * * * *